US010155341B2

(12) United States Patent
Ohki et al.

(10) Patent No.: US 10,155,341 B2
(45) Date of Patent: Dec. 18, 2018

(54) FIBER-REINFORCED PLASTIC JOINED BODY, METHOD FOR PRODUCING FIBER-REINFORCED PLASTIC JOINED BODY, AND FIBER-REINFORCED MOLDED ARTICLE

(71) Applicant: Teijin Limited, Osaka-Shi, Osaka (JP)

(72) Inventors: Takeru Ohki, Osaka (JP); Hiroki Sano, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 274 days.

(21) Appl. No.: 15/305,794

(22) PCT Filed: Apr. 15, 2015

(86) PCT No.: PCT/JP2015/061607
§ 371 (c)(1),
(2) Date: Oct. 21, 2016

(87) PCT Pub. No.: WO2015/163218
PCT Pub. Date: Oct. 29, 2015

(65) Prior Publication Data
US 2017/0043526 A1 Feb. 16, 2017

(30) Foreign Application Priority Data

Apr. 25, 2014 (JP) .................. 2014-091433
Apr. 25, 2014 (JP) .................. 2014-091434

(51) Int. Cl.
*B29C 65/00* (2006.01)
*B32B 5/00* (2006.01)
*C08J 5/00* (2006.01)
*B29C 65/08* (2006.01)
(Continued)

(52) U.S. Cl.
CPC ................ *B29C 65/08* (2013.01); *B32B 5/00* (2013.01); *C08J 5/04* (2013.01); *B29K 2307/04* (2013.01); *B29L 2009/00* (2013.01)

(58) Field of Classification Search
CPC . B29C 65/00; B29C 65/08; B32B 5/00; C08J 5/00; C08J 5/04
See application file for complete search history.

(56) References Cited

U.S. PATENT DOCUMENTS 6,001,201 A * 12/1999 Vincent .................. B29C 65/08
156/580.2
6,511,563 B2 * 1/2003 Roylance ............ B29C 66/8244
156/308.2

(Continued)

FOREIGN PATENT DOCUMENTS

| JP | 2007-313778 A | 12/2007 |
| JP | 2012-158141 A | 8/2012 |
| JP | 2013-233729 A | 11/2013 |

OTHER PUBLICATIONS

Mar. 22, 2017—(EP) Supplementary Search Report—App 15783673.

(Continued)

*Primary Examiner* — Jacob T Minskey
*Assistant Examiner* — Matthew Hoover
(74) *Attorney, Agent, or Firm* — Banner & Witcoff, Ltd.

(57) ABSTRACT

A fiber-reinforced plastic joined body is provided, in which a fiber-reinforced molded article (X) containing carbon fibers and a thermoplastic resin and having a joining surface (x), and a thermoplastic resin member (Y) having a joining surface (y) are welded via the joining surfaces (x) and (y) by applying ultrasonic to the molded article (X), and in which:

(1) a maximum value of tan δ by viscoelastic measurement of the molded article (X) is less than 70% of a maximum value of tan δ by viscoelastic measurement of the thermoplastic resin contained in the molded article (X) within a range of a glass transition temperature ±100° C. of the thermoplastic resin contained in the molded article (X), (2) at least one of the joining surfaces (x) and (y) has an energy director, and (Continued)

(3) an application surface of the molded article (X) to which ultrasonic sound is applied is smooth.

14 Claims, 11 Drawing Sheets

(51) Int. Cl.
*C08J 5/04* (2006.01)
*B29K 307/04* (2006.01)
*B29L 9/00* (2006.01)

(56) References Cited

U.S. PATENT DOCUMENTS

2008/0210360 A1* 9/2008 Soccard .............. B29C 65/08
 156/73.4
2010/0173161 A1* 7/2010 Beehag ............. B29C 65/0627
 428/411.1

OTHER PUBLICATIONS

Xiaolin Wang et al., "FEM investigation of the temperature field of energy director during ultrasonic welding of PEEK composites", Journal of Thermoplastic Composite Materials Sage Publications USA, vol. 19, No. 5, Sep. 2006, pp. 593-607.

Irene Fernandez Villegas et al., "Process and performance evaluation of ultrasonic, induction and resistance welding of advanced thermoplastic composites", Journal of Thermoplastic Composite Materials Sage Publications USA, vol. 26, No. 8, Sep. 2013, pp. 1007-1024.

Jul. 14, 2015—International Search Report—Intl App PCT/JP2015/061607.

Jul. 14, 2015—(WO) Written Opinion of ISA—Intl App PCT/JP2015/061607—partial Eng Tran.

Jan. 12, 2016—(WO) Written Opinion of IPEA—Intl App PCT/JP2015/061607—partial Eng Tran.

* cited by examiner

FIBER-REINFORCED PLASTIC JOINED BODY, METHOD FOR PRODUCING FIBER-REINFORCED PLASTIC JOINED BODY, AND FIBER-REINFORCED MOLDED ARTICLE

CROSS REFERENCE TO RELATED APPLICATIONS

This is a U.S. National Phase Application under 35 U.S.C. § 371 of International Application No. PCT/JP2015/061607, filed Apr. 15, 2015, which claims priority to Japanese Application Nos. 2014-091433, filed Apr. 25, 2014, and 2014-091434, filed Apr. 25, 2014, the entire contents of each of which are incorporated herein by reference.

TECHNICAL FIELD

The present invention relates to a fiber-reinforced plastic joined body containing carbon fibers and a thermoplastic resin. More precisely, the invention relates to a fiber-reinforced plastic joined body enjoying good productivity and joining strength, which is favorably used for structural parts as typified by automobiles.

BACKGROUND ART

Recently, in the machinery field, a fiber-reinforced resin material containing carbon fibers and a thermoplastic resin has come to receive attention, and in joining fiber-reinforced resin materials necessary in production of parts and structures, a method of increasing rigidity by forming a closed cross section has been proposed. In joining fiber-reinforced resin materials using a thermoplastic resin as the matrix therein, mechanical fastening using bolts, nuts, rivets or the like, chemical joining using an adhesive, and thermal joining using ultrasonic welding, vibration welding or the like has heretofore been proposed, and above all, ultrasonic welding is widely used in various industrial fields for the reason that it does not require any third material and additionally the cycle time thereof is short.

Ultrasonic welding is a method of welding a workpiece to another workpiece that is in contact therewith, in which a resonator called a welding horn is pressed against workpieces while high-frequency mechanical vibration is given from the resonator, and the mechanical vibration transferred to the workpieces is converted into frictional heat to thereby heat and fuse a part of the workpieces.

Ultrasonic welding includes, as roughly classified, two techniques. One is a welding method through ultrasonic application in direct contact with a fiber-reinforced resin material (Patent Document 1), and another is a welding method where projections called energy directors are formed on the surface of a fiber-reinforced resin material and the energy directors are intensively vibrated and fused in ultrasonic application (Patent Document 2, Patent Document 3).

In general, the former method is used for welding thin materials such as film laminates or the like, but Patent Document 1 describes an invention in which a hat-shaped molded article is produced from an isotropic base material containing carbon fibers and a thermoplastic resin, and a pair of the molded articles are ultrasonically spot-welded to form a tubular joined body.

The latter method may be used in welding samples thicker than films, in which, however, the time for ultrasonic application tends to be long. This is because the ultrasonic mechanical vibration attenuates inside the resin and therefore the ultrasonic mechanical vibration could not be utilized efficiently for welding.

Recently, it has become desired to efficiently produce a joined body more excellent in joining strength.

TECHNICAL DOCUMENTS OF RELATED ART

Patent Documents

Patent Document 1: JP-A 2012-158141
Patent Document 2: JP-A 2013-233729
Patent Document 3: JP-A 2007-313778

SUMMARY OF INVENTION

Problems to be Solved by Invention

However, when the joining method described in Patent Document 1 is used for enhancing the welding efficiency, the final joined body has deep recesses that are unfavorable in point of the outward appearance thereof, since the fiber-reinforced resins are joined in a mode of spot welding. Regarding the joining method described in Patent Document 2, recesses exist in the ultrasonic-applied surface to also worsen the outward appearance. In the fiber-reinforced resin molded article of Patent Document 3, the joining parts of the composite material not given ultrasonic application must be softened by preheating, which is unfavorable in point of the production process.

Accordingly, an object of the present invention is to provide a fiber-reinforced plastic joined body excellent in productivity and joining strength and having good surface appearance.

Means for Solving the Problems

As a result of assiduous studies, the present inventors have found that the above-mentioned problems can be solved by the following means, and have achieved the present invention.

1. A fiber-reinforced plastic joined body in which a fiber-reinforced molded article (X) containing carbon fibers and a thermoplastic resin and having a joining surface (x), and a thermoplastic resin member (Y) having a joining surface (y) are welded via the joining surface (x) and the joining surface (y) by applying ultrasonic to the fiber-reinforced molded article (X), in which:

(1) a maximum value of tan δ by viscoelastic measurement of the fiber-reinforced molded article (X) is less than 70% of a maximum value of tan δ by viscoelastic measurement of the thermoplastic resin contained in the fiber-reinforced molded article (X) within a range of a glass transition temperature ±100° C. of the thermoplastic resin contained in the fiber-reinforced molded article (X), (2) at least one of the joining surface (x) and the joining surface (y) has an energy director, and (3) an application surface of the fiber-reinforced molded article (X) to which ultrasonic sound is applied is smooth.

2. The fiber-reinforced plastic joined body according to the above 1, in which the fiber-reinforced molded article (X) contains 3 parts by mass to 1000 parts by mass of a thermoplastic resin relative to 100 parts by weight of carbon fibers.

3. The fiber-reinforced plastic joined body according to any one of the above 1 to 2, in which the fiber-reinforced molded article (X) contains carbon fiber bundles.

4. The fiber-reinforced plastic joined body according to any one of the above 1 to 3, in which the carbon fibers contained in the fiber-reinforced molded article (X) include, as mixed therein, carbon fiber bundles (A) constituted by a critical number of single fiber of carbon fibers or more and carbon fiber bundles (B1) of less than the critical number of single fiber and/or single carbon fibers (B2), the ratio of the carbon fiber bundles (A) to a total amount of fibers is 20 to 99% by volume, and an average number (N) of fibers in the carbon fiber bundles (A) satisfies the requirement of the following formula:

Critical number of single fiber=600/D (a)

$0.6 \times 10^4/D^2 < N < 6 \times 10^5/D^2$ (b)

where D is an average fiber diameter (μm) of carbon fibers.

5. The fiber-reinforced plastic joined body according to any one of the above 1 to 4, in which an average fiber length of the carbon fibers is 1 to 100 mm.

6. The fiber-reinforced plastic joined body according to any one of the above 1 to 5, in which the thermoplastic resin member (Y) contains carbon fibers.

7. The fiber-reinforced plastic joined body according to any one of the above 1 to 5, in which the energy director is integrated with at least one of the fiber-reinforced molded article (X) containing two-dimensionally randomly oriented discontinuous carbon fibers, or the thermoplastic resin member (Y) containing two-dimensionally randomly oriented discontinuous carbon fibers, and a volume ratio of the carbon fibers (Vf) in the energy director is lower than a volume ratio of the carbon fibers (Vf) in the fiber-reinforced molded article (X) or the thermoplastic resin member (Y) integrated with the energy director.

8. The fiber-reinforced plastic joined body according to any one of the above 1 to 7, in which the energy director is a mountain-shaped energy director satisfying the following (4) to (6):

(4) the mountain-shaped energy director has a convex part in the area from a base up to a top thereof, (5) the mountain-shaped energy director has a transition interval from the top toward the base thereof where a cross-sectional area of the energy director in a direction of the joining surface increases, and (6) an amount of change in an area of a horizontal section of the energy director in the transition interval is 0.1 mm² or more per mm in a vertical direction relative to a joining direction.

9. The fiber-reinforced plastic joined body according to the above 8, in which a ridge line of the mountain-shaped energy director is an arc having a radius of curvature of 0.1 to 2 mm.

10. The fiber-reinforced plastic joined body according to any one of the above 8 to 9, in which a projected area of the mountain-shaped energy director is 25 to 105% of a projected area of a welded part after joining.

11. The fiber-reinforced plastic joined body according to any one of the above 1 to 10, in which the thermoplastic resin contained in the fiber-reinforced molded article (X) is polyamide 6, and the maximum value of tan δ by viscoelastic measurement of the fiber-reinforced molded article (X) is 0.02 to 0.1 within the range of the glass transition temperature ±100° C. of the thermoplastic resin contained in the fiber-reinforced molded article (X).

12. A method for producing a fiber-reinforced plastic joined body in which a fiber-reinforced molded article (X) containing carbon fibers and a thermoplastic resin and having a joining surface (x), and a thermoplastic resin member (Y) having a joining surface (y) are welded via the joining surface (x) and the joining surface (y) by applying ultrasonic to the fiber-reinforced molded article (X), in which:

(1) a maximum value of tan δ by viscoelastic measurement of the fiber-reinforced molded article (X) is less than 70% of a maximum value of tan δ by viscoelastic measurement of the thermoplastic resin contained in the fiber-reinforced molded article (X) within a range of a glass transition temperature ±100° C. of the thermoplastic resin contained in the fiber-reinforced molded article (X), (2) at least one of the joining surface (x) and the joining surface (y) has an energy director, and (3) an application surface of the fiber-reinforced molded article (X) to which ultrasonic sound is applied is smooth.

13. A fiber-reinforced molded article (X) containing carbon fibers and a thermoplastic resin and having a joining surface (x), the fiber-reinforced molded article (X) being utilized in production of a fiber-reinforced plastic joined body by ultrasonic application thereto, in which:

(1) a maximum value of tan δ by viscoelastic measurement of the fiber-reinforced molded article (X) is less than 70% of a maximum value of tan δ by viscoelastic measurement of the thermoplastic resin contained in the fiber-reinforced molded article (X) within a range of a glass transition temperature ±100° C. of the thermoplastic resin contained in the fiber-reinforced molded article (X), (2) the joining surface (x) has an energy director, and (3) an application surface of the fiber-reinforced molded article (X) to which ultrasonic sound is applied is smooth.

Advantageous Effects of Invention

A fiber-reinforced plastic joined body of the present invention realizes excellent productivity, joining strength and surface appearance through application of ultrasonic to a fiber-reinforced molded article having a specific viscoelastic strength.

DESCRIPTION OF EMBODIMENTS

1. Fiber-Reinforced Molded Article (X)

Figure 1:
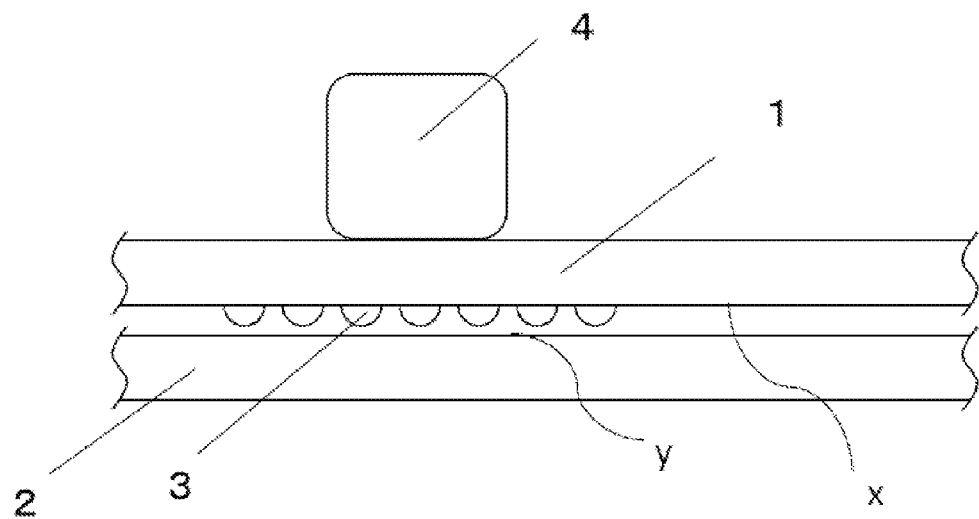
FIG. 1 is a schematic view in ultrasonic welding.

The fiber-reinforced molded article (X) in the present invention contains carbon fibers and a thermoplastic resin.

1.1 Carbon Fibers

Carbon fibers are not specifically limited, but concretely include PAN carbon fibers, pitch carbon fibers. Above all, as lightweight, PAN carbon fibers are favorably used for weight reduction of structural materials. One alone or two or more kinds of carbon fibers may be used. The morphology of carbon fibers is not specifically limited, and any of continuous fibers or discontinuous fibers are usable.

When continuous carbon fibers are used, they may be in any form of knitted fabric or woven fabric, and may be in a form of a so-called UD sheet produced by unidirectionally aligning the fibers. As the UD sheet, those produced by stacking the fibers into a multilayer structure in such a manner that the fiber orientation direction in each layer crosses with each other (for example, by layering alternately in an orthogonal direction). Generally, it is suitable that the average fiber diameter of the continuous fibers is 5 to 20 µm.

In the case of discontinuous carbon fibers, the carbon fibers may be aligned in a specific direction in a thermoplastic resin, and may be two-dimensionally randomly dispersed in plane, or may be three-dimensionally randomly dispersed. The carbon fibers for use herein may have an average fiber diameter of 5 to 20 µm and an average fiber length of 1 to 100 mm.

Continuous carbon fibers and discontinuous carbon fibers may be combined in one fiber-reinforced molded article (X). One fiber-reinforced molded article containing continuous fibers may be combined with another fiber-reinforced molded article containing discontinuous fibers by layering them.

In the case where discontinuous carbon fibers are two-dimensionally randomly dispersed, the fiber-reinforced molded article (X) may be produced by press-molding as mentioned below, and in the case, the carbon fibers may be formed into sheets in a mode of wet-papermaking, or the discontinuous carbon fibers may be stacked and arranged as dispersed to give sheets or mats (hereinafter both may be referred to as mats). The average fiber diameter in the case is 5 to 20 µm, and the average fiber length is preferably 1 to 100 mm, more preferably 3 to 100 mm, even more preferably 10 to 100 mm, still further more preferably 12 to 50 mm. Regarding the latter mats, the average fiber length of the carbon fibers contained in the mats is important, and when the average fiber length is longer than 1 mm, the fibers can readily fulfil the role of carbon fibers and can realize a sufficient strength. In turn, when the average fiber length is shorter than 100 mm, the flowability of the fibers in molding is good and desired molded articles can be produced with ease.

In the present invention, the carbon fibers may be floc-like entangled to give a three-dimensionally isotropic carbon fiber mat where the long axis direction of the carbon fibers is randomly dispersed in each direction of XYZ, but when press-molding to be mentioned below is employed, it is desirable that the carbon fibers whose average fiber length falls within the above-mentioned range are substantially two-dimensionally randomly oriented to give a mat (hereinafter referred to as a random mat).

Here, the wording, substantially two-dimensionally randomly oriented means that the carbon fibers are not aligned unidirectionally in a specific direction in the in-plane direction of fiber-reinforces plastics but are oriented at random, and as a whole, they are arranged in a sheet plane with no specific directionality therein. The fiber-reinforced molded article (X) obtained using the random mat is a substantially isotropic material having no in-plane anisotropy.

In the above-mentioned random mat, all or almost all of the carbon fibers may exist as single fiber-like opened ones, but an isotropic random mat is especially preferred in which fiber bundles formed by bundling at least a certain number of single fibers and single fibers or fiber bundles in a state similar thereto exist, as mixed in a predetermined ratio therein. The isotropic random mat of the type and its production method are described in detail in WO 2012/105080 and JP-A 2013-49298.

The above-mentioned preferred random mat is an isotropic random mat containing, as mixed therein, carbon fiber bundles (A) constituted by a critical number of single fiber of carbon fibers defined by the following formula (a) or more and carbon fiber bundles (B1) of less than the critical number of single fiber and/or single carbon fibers (B2), and the ratio of the carbon fiber bundles (A) to the total amount of fibers in the isotropic random mat is 20 to 99% by volume, preferably 30 to 90% by volume, and the average number (N) of fibers in the carbon fiber bundles (A) satisfies the following formula (b).

Critical number of single fiber=600/D   (a)

$0.6 \times 10^4/D^2 < N < 6 \times 10^5/D^2$   (b)

wherein D is an average fiber diameter (m) of carbon fibers.

When the average number (N) of the fibers in the carbon fiber bundles (A) is not more than $0.6 \times 10^4/D^2$, those having a high volume ratio of carbon fibers (Vf) would be difficult to obtain, and fiber-reinforced plastics having an excellent strength would be difficult to obtain. In turn, when the average number (N) of the fibers in the carbon fiber bundles (A) is not less than $0.6 \times 10^5/D^2$, thick parts may form locally to be a cause of voids. Further, fiber-reinforced plastics using the random mat of the type are advantageous in that projections are easy to form on the surfaces thereof. More preferably, the range of the average number (N) of the fibers is $0.6 \times 10^4/D^2 < N < 1 \times 10^5/D^2$.

1.2 Average Fiber Diameter of Carbon Fibers

In the fiber-reinforced molded article (X) for use in the present invention, the average fiber diameter of the carbon fibers is preferably 5 to 20 µm, more preferably 5 to 12 µm. Specifically, in the case where the average fiber diameter of the carbon fibers constituting a fiber-reinforced plastic is 5 to 7 µm, the critical number of single fiber defined by the above formula (a) is 86 to 120. In the case where the average fiber diameter of the carbon fibers is 5 µm, the average number of the fibers in the carbon fiber bundles (A) is within a range of 240 to less than 24000, but is preferably 240 to 4000, more preferably 300 to 2500. Even more preferably, it is 400 to 1600. In the case where the average fiber diameter of the carbon fibers is 7 µm, the average number of the fibers in the carbon fiber bundles (A) is 122 to 12245, but is preferably 122 to 2040, more preferably 150 to 1500, even more preferably 200 to 800.

1.3 Length of Carbon Fibers

The length of the carbon fibers contained in the fiber-reinforced molded article (X) is expressed by the average fiber length of the carbon fibers in the site corresponding to the fiber-reinforced molded article (X) in the fiber-reinforced plastic joined body after joining. As the method for measuring the average fiber length, for example, there may be employed a method where the fiber length of randomly extracted 100 fibers is individually measured to a unit of 1 mm using a caliper or the like and the found data are averaged. The preferred average fiber length of the carbon fibers is as mentioned above. The above-mentioned random mat may be formed of carbon fibers having a single fiber length, or may be formed of carbon fibers having a different fiber length as mixed.

In the case where carbon fibers are cut with a rotary cutter or the like to have a given length and used, the average fiber length of the carbon fibers corresponds to the cut length, and this is a number-average fiber length and also a weight-average fiber length. When the fiber length of the individual carbon fibers is represented by Li and the number of the carbon fibers to be measured is by j, the number-average fiber length (Ln) and the weight-average fiber length (Lw) are represented by the following formulae (2) and (3), respectively. (In the case of a given cut length, the weight-average fiber length (Lw) may be calculated according to the calculating formula (2) for the number-average fiber length (Ln).)

$Ln = \Sigma Li/j$      Formula (2)

$Lw = (\Sigma Li^2)/(\Sigma Li)$      Formula (3)

The measurement of the average fiber length in the present invention may be for the number-average fiber length or for the weight-average fiber length.

Further, the fiber-reinforced molded article (X) may contain carbon fibers in a different orientation.

Examples of the embodiment containing carbon fibers in a different orientation include (i) an embodiment where carbon fibers in a different orientation are arranged in the in-plane direction of the fiber-reinforced molded article (X), and (ii) an embodiment where carbon fibers in a different orientation are arranged in the thickness direction of the fiber-reinforced molded article (X).

In the case where the base material has a layered structure of plural layers, there is further mentioned (iii) an embodiment where carbon fibers contained in each layer are in a different orientation. In addition, there are also mentioned other embodiments of a combination of the above embodiments (i) to (iii).

1.4 Areal Weight of Carbon Fibers

In the fiber-reinforced molded article (X), the areal weight of the carbon fibers is within a range of 25 to 10000 g/m², in which the ratio of the carbon fiber bundles (A) constituted by a critical number of single fiber of carbon fibers as defined by the above formula (a) or more to the total areal weight of the carbon fibers falls within the above-mentioned range, and the average number (N) of the fibers in the carbon fiber bundles (A) satisfies the above formula (b), and accordingly, the balance between the moldability of the fiber-reinforced molded article (X) as a composite material and the mechanical strength thereof is bettered. The areal weight of the carbon fibers is preferably 25 g/m² to 4500 g/m².

1.5 Thermoplastic Resin 1.5.1 Kind of Thermoplastic Resin

The thermoplastic resin contained in the fiber-reinforced molded article (X) is not specifically limited, and examples thereof include vinyl chloride resin, vinylidene chloride resin, vinyl acetate resin, polyvinyl alcohol resin, polystyrene resin, acrylonitrile-styrene resin (AS resin), acrylonitrile-butadiene-styrene resin (ABS resin), acrylic resin, methacrylic resin, polyethylene resin, polypropylene resin, various kinds of thermoplastic polyamide resins, polyacetal resin, polycarbonate resin, polyethylene terephthalate resin, polyethylene naphthalate resin, polybutylene naphthalate resin, polybutylene terephthalate resin, polyarylate resin, polyphenylene ether resin, polyphenylene sulfide resin, polysulfone resin, polyether sulfone resin, polyether ether ketone resin, polylactic resin, etc. Above all, there are mentioned nylon (hot-melt polyamide), polycarbonate, polyoxymethylene, polyphenylene sulfide, polyphenylene ether, modified polyphenylene ether, polyethylene terephthalate, polybutylene terephthalate, polyethylene naphthalate, polyethylene, polypropylene, polystyrene, polymethyl methacrylate, AS resin, ABS resin, etc.

Above all, from the viewpoint of the balance of cost and physicality, at least one selected from a group consisting of nylon, polypropylene, polycarbonate and polyphenylene sulfide is preferred. As nylon (hereinafter this may be abbreviated as "PA"), at least one selected from a group consisting of PA 6 (also referred to as polycaproamide, polycaprolactam, poly-ε-caprolactam), PA 26 (polyethyleneadipamide), PA 46 (polytetramethyleneadipamide), PA 66 (polyhexamethyleneadipamide), PA 69 (polyhexamethyleneazepamide), PA 610 (polyhexamethylenesebacamide), PA 611 (polyhexamethyleneundecanamide), PA 612 (polyhexamethylenedodecamide), PA 11 (polyundecanamide), PA 12 (polydodecanamide), PA 1212 (polydodecamethylenedodecamide), PA 6T (polyhexamethyleneterephthalamide), PA 61 (polyhexamethyleneisophthalamide), PA 912 (polynonamethylenedodecanamide), PA 1012 (polydecamethylenedodecanamide), PA 9T (polynonamethyleneterephthalamide), PA 91 (polynonamethyleneisophthalamide), PA 10T (polydecamethyleneterephthalamide), PA 101 (polydecamethyleneisophthalamide), PA 11T (polyundecamethyleneterephthalamide), PA 111 (polyundecamethyleneisophthalamide), PA 12T (polydodecamethyleneterephthalamide), PA 121 (polydodecamethyleneisophthalamide) and polyamide MXD 6 (polymetaxylyleneadipamide) is preferred. If desired, these thermoplastic resins may contain additives such as a stabilizer, a flame retardant, a pigment, a filler, etc. One alone or two or more kinds of these thermoplastic resins may be used either singly or as combined. Examples of the embodiment of using two or more types of thermoplastic resins as combined include, but not limited thereto, an embodiment of using thermoplastic resins differing from each other in point of the softening point or the melting point, and an embodiment of using thermoplastic resins differing from each other in point of the average molecular weight.

1.5.2 Content of Thermoplastic Resin

The content of the thermoplastic resin in the fiber-reinforced molded article (X) is preferably 3 to 1000 parts by weight relative to 100 parts by weight of the carbon fibers therein. When the amount of the thermoplastic resin is 3 parts by weight or more relative to 100 parts by weight of the carbon fibers, resin infiltration could be sufficient and the case is preferred since dry carbon fibers do not increase. In the case where the content is not more than 1000 parts by weight, carbon fibers can be contained sufficiently to stabilize the article as a structural material.

1.6 Volume Ratio of Carbon Fibers (Vf)

In the fiber-reinforced molded article (X) in the present invention, the volume ratio of the carbon fibers (Vf) defined by the following formula (1) (hereinafter this may be simply referred to as "Vf") is not specifically limited, but the volume ratio of the carbon fibers (Vf) is preferably 10 to 70% by volume.

$$Vf=100\times(\text{volume of carbon fibers})/(\text{volume of carbon fibers}+\text{volume of thermoplastic resin}) \quad \text{Formula (1)}$$

When the volume ratio of the carbon fibers is 10% by volume or more, desired mechanical properties are easy to obtain. In turn, the volume ratio of 70% by volume or less is preferred since the thermoplastic resin could be sufficient and dry carbon fibers do not increase. A more preferred range of the volume ratio of the carbon fibers (Vf) in the fiber-reinforced molded article (X) is 20 to 60% by volume, and an even more preferred range thereof is 30 to 50% by volume.

1.7 Thickness of Fiber-Reinforced Molded Article (X)

The thickness of the fiber-reinforced molded article (X) for use in the present invention is not specifically limited, but is, in general, preferably within a range of 0.01 mm to 100 mm, more preferably 0.01 mm to 10 mm, even more preferably 0.1 to 5 mm, and further more preferably 1 to 5 mm.

In the case where the fiber-reinforced molded article (X) for use in the present invention has a layered configuration of plural layers, the above-mentioned thickness does not indicate the thickness of each layer but indicates the total thickness of the fiber-reinforced molded article (X) calculated by totaling the thickness of the each constituent layer.

The fiber-reinforced molded article (X) for use in the present invention may have a single-layer structure formed of a single layer, or a multilayer structure formed of plural layers.

Examples of the embodiment of the layered structure of the fiber-reinforced molded article (X) include an embodiment where plural layers having the same composition are layered, and an embodiment where plural layers each having a different composition are layered. The embodiment having a layered structure further includes an embodiment where layers differing from each other in the carbon fiber orientation state are layered. Examples of the embodiment of the type include an embodiment where a layer of unidirectionally aligned carbon fibers and a layer of two-dimensionally randomly oriented carbon fibers are layered.

In the case of layering three or more layers, the embodiment may have a sandwich structure including an arbitrary core layer and skin layers layered on both the surface and the back of the core layer.

1.8 Other Components Contained in Fiber-Reinforced Molded Article (X)

The fiber-reinforced molded article (X) for use in the present invention may contain additives such as various fibrous or non-fibrous fillers of organic fibers or inorganic fibers, a flame retardant, a UV-resistant agent, a stabilizer, a lubricant, a pigment, a softener, a plasticizer, a surfactant, etc., within a range not detracting from the object of the present invention. Also within a range not detracting from the object of the present invention, the fiber-reinforced molded article (X) may contain a thermosetting resin as combined with the thermoplastic resin therein.

1.9 More Preferred Embodiment of Fiber-Reinforced Molded Article (X)

An especially preferred embodiment of the fiber-reinforced molded article (X) for use in the present invention is a fiber-reinforced molded article (X) that contains carbon fibers having an average fiber length of 3 to 100 mm, more preferably 10 to 100 mm and a thermoplastic resin in such a ratio that the thermoplastic resin is 30 to 200 parts by weight relative to 100 parts by weight of the carbon fibers, and the fiber-reinforced resin molded article (X) includes:

(i) a sheet-like article having thickness of 0.5 to 5 mm, (ii) in which the carbon fibers are randomly arranged in the in-plane direction, (iii) the total areal weight of the fibers is within a range of 25 to 4500 g/m$^2$, (iv) the ratio of the carbon fiber bundles (A) constituted by a critical number of single fiber of carbon fibers defined by the following formula (a) or more relative to all the carbon fibers is 50 to 90% by volume, and (v) the average number (N) of the fibers in the carbon fiber bundles (A) satisfies the following formula (c).

$$\text{Critical number of single fiber}=600/D \quad (a)$$

$$0.7\times10^4/D^2<N<1\times10^5/D^2 \quad (c)$$

wherein D is an average fiber diameter (pa) of carbon fibers.

2. Method for Producing Fiber-Reinforced Molded Article (X)

A specific method for producing the fiber-reinforced molded article (X) in the present invention includes injection molding, extrusion molding, press molding, etc. In the case of press molding, the fiber-reinforced molded article (X) is plasticized by heating just before molding, and introduced into a mold.

2.1 Injection Molding

For injection molding, any conventionally-known method is employable. For example, long-fiber pellets, that is, pellets obtained by immersing continuous fibrous carbon fibers in a molten thermoplastic resin that has been controlled to have a given viscosity, and then pelletizing them to have a size of 3 to 10 mm are molded to have a given shape using an injection-molding machine.

In the case where the fiber-reinforced molded article (X) is obtained by injection molding, it is desirable that the carbon fibers are dispersed to have an average fiber length of 0.01 mm or more in the molded article (X), and more preferably dispersed to have an average fiber length of 0.1 mm or more, even more preferably an average fiber length of 0.4 mm or more.

The upper limit of the average fiber length of the remaining carbon fibers is not specifically limited but may be defined depending on the use and the molding method employed. For example, in the molded article obtained by injection molding of a molding material that has been prepared by pelletizing strands of easily penetrable carbon fiber bundles coated with a thermoplastic resin, using a strand cutter, the average fiber length of the carbon fibers is generally about 10 mm or less, and the carbon fibers into which the thermoplastic resin has penetrated more would be more readily broken during injection molding, and therefore the molded article of the type may contain a large number of carbon fibers having an average fiber length of 2 mm or less.

2.2 Press Molding

In the case where the fiber-reinforced molded article (X) for use in the present invention is produced by press-molding, for example, a single layer or plural layers of a UD sheet where continuous fibers are unidirectionally aligned, or a sheet produced in a mode of papermaking from discontinuous fibers, or the above-mentioned random mat or the like is/are heated under pressure so that the thermoplastic resin existing in the sheet or the mat is melted and infiltrated into the fibers to produce a fiber-reinforced molded article (X) in which the thermoplastic resin serves as a matrix therein. In this case, the thermoplastic resin may be supplied in production of the sheet or the mat of carbon fibers, or after production of the sheet or the mat of carbon fibers, a layer (film, nonwoven fabric, sheet or the like) of a thermoplastic resin may be layered on at least one surface of the sheet or the mat and then heated under pressure so as to make the thermoplastic resin penetrate into the sheet or the mat to produce the intended article.

More specifically, in the case of press molding to produce the article, for example, there may be mentioned a method where a unidirectionally aligned sheet (UD sheet) in which continuous fiber strands are aligned in parallel, a woven fabric, or the above-mentioned isotropic random mat is arranged in a mold, then a thermoplastic resin is injected thereinto, melted and infiltrated into the fibers, or a molten hot thermoplastic resin is injected and infiltrated into the fibers, and then cooled. There may also be mentioned a method of arranging a film or the like of a thermoplastic resin in a mold along with carbon fibers, then heating and pressing them. In addition, a method where an isotropic random mat containing a thermoplastic resin such as that mentioned above is put in a mold set at a predetermined temperature and pressing it therein is also preferred. The heating temperature is preferably within a range of the melting temperature of the thermoplastic resin +15° C. or lower and up to the decomposition temperature thereof −30° C.

In the present invention, it is desirable to press-mold the above-mentioned, thermoplastic resin-containing isotropic random mat to give the fiber-reinforced molded article (X), since the method is excellent in productivity and isotropicity. The fiber-reinforced molded article (X) obtained by the use of the isotropic random mat can be formed to have a desired shape and the surface appearance thereof can be maintained and bettered.

Specifically, after heated up to a temperature of the softening point of the thermoplastic resin+30° C. or higher so as to be softened, the mat is arranged in a mold and pressed. On this occasion, regarding the pressing condition, a pressure of 0.1 to 20 MPa, preferably 0.2 to 15 MPa, more preferably 0.5 to 10 MPa is applied to the mat. When the pressure is less than 0.1 MPa, the isotopic random mat could not be fully pressed so that spring-back may occur to lower the material strength. In turn, when the pressure is more than 20 MPa and, for example, when the isotropic random mat is large, an extremely large-sized pressing machine is necessary, and such is often unfavorable from an economical viewpoint. Regarding the heating condition during pressing, the temperature inside the mold may depend on the kind of the thermoplastic resin since the molten thermoplastic resin is cooled and solidified to form a fiber-reinforced plastic, and therefore, when the thermoplastic resin is crystalline, the temperature is preferably lower by 20° C. or more than the crystal-melting temperature thereof, but when the resin is amorphous, the temperature is preferably lower by 20° C. or more than the glass transition temperature thereof. For example, in the case of nylon, the temperature is generally 120 to 180° C., preferably 125 to 170° C., more preferably 130 to 160° C.

The glass transition temperature of the thermoplastic resin may be measured using a scanning differential calorimeter (DSC), in which the resin is put in the sample pan, this is heated from 30° C. up to 300° C. at 10° C./min in a nitrogen stream atmosphere (1st-run), then cooled down to 30° C. at −10° C./min, and again heated from 30° C. up to 300° C. at 10° C./min (2nd-run). In the 2nd-run, the temperature at which the base line has begun to deviate from the low-temperature side is referred to as the glass transition temperature (Tg) of the sample analyzed.

3. Thermoplastic Resin Member (Y)

Next described is the thermoplastic resin member (Y) in the present invention.

3.1 Thermoplastic Resin Contained in Thermoplastic Resin Member (Y)

The thermoplastic resin contained in the thermoplastic resin member (Y) (hereinafter this may be simply referred to as member (Y)) is not specifically limited so far as it may be joined by ultrasonic welding. Specific examples of the resin include general-purpose plastics such as polyethylene, polyvinyl chloride, polystyrene, ABS, acrylic resin, etc.; engineering plastics such as polyamide, polycarbonate, polyphenylene ether, polyester (PET, PBT, etc.), cyclic polyolefin (COP), etc.; super-engineering plastics such as polyphenylene sulfide (PPS), polyether ketone (PEK), polyether ether ketone (PEEK), polytetrafluoroethylene, thermoplastic polyimide, polyarylate, polysulfone, polyether sulfone (PES), liquid-crystal polymer (LCP), polyamideimide, etc. One kind or two or more kinds of these thermoplastic resins may be used. Examples of the embodiment of using two or more kinds of thermoplastic resins as combined include, though not limited thereto, an embodiment of using thermoplastic resins differing from each other in the softening point or the melting point as combined, and an embodiment of using thermoplastic resins differing from each other in the average molecular weight as combined.

In the present invention, in particular, from the viewpoint of the balance between joining strength and lightweightness, the member (Y) preferably contains the same thermoplastic resin as that contained in the fiber-reinforced molded article (X).

3.2 Reinforcing Fibers Contained in Thermoplastic Resin Member (Y)

The member (Y) may contain inorganic fibers such as glass fibers, carbon fibers, etc., as well as organic fibers such as aramid fibers, polyester fibers, polyamide fibers, etc., as reinforcing fibers therein.

Depending on the object thereof, the reinforcing fibers contained in the member (Y) may be the same carbon fibers as those contained in the fiber-reinforced molded article (X), or may differ from the latter, but from the viewpoint of productivity, the two are preferably the same carbon fibers.

3.3 Content of Thermoplastic Resin in Member (Y) Containing Reinforcing Fibers In the case where the member (Y) contains reinforcing fibers, the content of the thermoplastic resin therein may be suitably determined depending on the kind of the resin and the kind of the reinforcing fibers, and is not specifically limited, but in general, the content of the resin is within a range of 3 parts by mass to 1000 parts by mass relative to 100 parts by mass of the reinforcing fibers. More preferably, the content is 30 to 200 parts by weight, even more preferably 30 to 150 parts by weight, still more preferably 35 to 100 parts by weight. When the content of the thermoplastic resin is less than 3 parts by weight relative to 100 parts by weight of the reinforcing fibers, dry reinforcing fibers into which the resin is infiltrated insufficiently in the production method to be mentioned hereinunder may increase. In turn, when the content is more than 1000 parts by weight, the amount of the reinforcing fiber is too small and would be therefore unsuitable for structural materials in many cases. In the fiber-reinforced molded article (X) and the member (Y) in the present invention, the ratio of the thermoplastic resin to the reinforcing fibers may be the same or, depending on the use thereof, may differ from between the two, but from the viewpoint of production, the ratio is preferably the same in the two.

3.4 Morphology of Carbon Fibers Contained in Member (Y)

In the case where the reinforcing fibers contained in the member (Y) in the present invention is carbon fibers, the fiber morphology thereof in point of the average fiber length and the opening degree thereof may be the same as or may differ from that of the fibers contained in the above-mentioned fiber-reinforced molded article (X), but from the viewpoint of production, the morphology is the same in the two.

3.5 Other Components Contained in Member (Y)

The member (Y) for use in the present invention may contain additives such as various fibrous or non-fibrous fillers of organic fibers or inorganic fibers, a flame retardant, a UV-resistant agent, a stabilizer, a lubricant, a pigment, a softener, a plasticizer, a surfactant, etc., within a range not detracting from the object of the present invention. Also within a range not detracting from the object of the present invention, the member (B) may contain a thermosetting resin in addition to the thermoplastic resin therein.

4. Method for Producing Member (Y)

The method for producing the member (Y) is not specifically limited, for which conventionally-used injection molding or press molding may be suitably used. When the member (Y) contains carbon fibers, the same production method as the above-mentioned "method for producing fiber-reinforced molded article (X)" is preferably used.

5. Joining Surface

The fiber-reinforced molded article (X) and the thermoplastic member (Y) have a joining surface (x) and a joining surface (y), respectively. The joining surface (x) (x in FIG. 1) and the joining surface (y) (y in FIG. 1) are surfaces that are in contact with each other after ultrasonic welding to give a joined body. Accordingly, the fiber-reinforced plastic joined body is welded via the joining surface (x) and the joining surface (y) after ultrasonic application to the fiber-reinforced molded article (X).

6. Energy Director

The fiber-reinforced plastic joined body of the present invention has an energy director on at least one of the joining surface (x) and the joining surface (y). The energy director is, for example, a projection as shown by 3 in FIG. 1, and since the energy directors are arranged on the joining surface, the ultrasonic vibration tends to be concentrated to secure favorable welding.

6.1 Position of Energy Director

In the fiber-reinforced plastic joined body of the present invention, the fiber-reinforced molded article (X) having energy directors and the thermoplastic resin member (Y) are made to face each other via the surfaces thereof to be joined (joining surface (x) and the joining surface (y)) kept facing each other (for example, in FIG. 1), and ultrasonic is applied to the fiber-reinforced molded article (X) so that the thermoplastic resin contained in the fiber-reinforced molded article (X) and the thermoplastic resin member (Y) is melted and then cooled whereby the thermoplastic resin is solidified, and in such a manner, the fiber-reinforced molded article (X) and the thermoplastic resin member (Y) are fixed to complete the joining of the two. The role of the energy director is to focus the vibration by ultrasonic to thereby more efficiently carry out the welding.

In the present invention, the energy directors may be arranged on any joining surface (joining surface (x), joining surface (y)) of the fiber-reinforced molded article (X) or the thermoplastic resin (Y) so far as they are arranged on the joining surface.

FIG. 1 shows a schematic view in joining by ultrasonic welding as one example of the present invention, in which the energy directors (3 in FIG. 1) are provided on the side of the joining surface (x) of the fiber-reinforced molded article (X) (1 in FIG. 1).

Preferably, the energy director is provided at the position corresponding to the application surface for ultrasonic application.

6.2 Volume Ratio of Carbon Fibers (Vf) in Energy Director

The fiber-reinforced plastic joined body of the present invention is produced through integration of an energy director with at least any one of a fiber-reinforced molded article (X) that contains two-dimensionally randomly oriented discontinuous carbon fibers, or a thermoplastic resin member (Y) that contains two-dimensionally randomly oriented discontinuous carbon fibers, in which the volume ratio of the carbon fibers (Vf) in the energy director part is preferably lower than the volume ratio of the carbon fibers (Vf) in the fiber-reinforced molded article (X) or the thermoplastic resin member (Y) integrated with the energy director.

Hereinunder embodiments where an energy director is integrated with a fiber-reinforced molded article (X) or a thermoplastic resin member (Y) are described individually.

6.2.1 Case of Integration with Fiber-Reinforced Molded Article (X)

In the fiber-reinforced plastic joined body of the present invention where an energy director is integrated with the fiber-reinforced molded article (X), the volume ratio of the carbon fibers (Vf) in the energy director part is preferably lower than the volume ratio of the carbon fibers (Vf) in the entire fiber-reinforced molded article (X).

In the case where the carbon fibers contained in the fiber-reinforced molded article (X) are discontinuous fibers that are two-dimensionally randomly oriented, the presence of the carbon fibers does not almost contribute toward the joining strength of the fiber-reinforced plastic joined body. This is considered to be a reason that the amount of the carbon fibers oriented in the through-thickness direction is small and therefore the amount of the fibers that bridge the fiber-reinforced molded article (X) and the thermoplastic resin member (Y) is small. Even if some carbon fibers exist in the thermoplastic resin member (Y), the carbon fibers contained in the fiber-reinforced molded article (X) and the thermoplastic resin member (Y) are entangled little with each other, since the carbon fibers contained in the fiber-reinforced molded article (X) are two-dimensionally randomly oriented.

Consequently, the joining strength (welding strength) may be exhibited mainly by welding of the thermoplastic resin contained in the fiber-reinforced molded article (X) and the thermoplastic resin member (Y). Therefore, by incorporating a large amount of a thermoplastic resin in the energy director part, that is, by lowering the volume ratio of the carbon fibers (Vf) in the energy director part than the volume ratio of all the carbon fibers (Vf) in the integrated, fiber-reinforced molded article (X), the stability of the joining strength after ultrasonic application can be enhanced. The method for evaluating the stability of the joining strength will be described below.

6.2.2 Case of Integration with Thermoplastic Resin Member (Y)

In the fiber-reinforced plastic joined body where the thermoplastic resin member (Y) contains two-dimensionally randomly oriented discontinuous carbon fibers and where an energy director is integrated with the thermoplastic resin (Y), the volume ratio of the carbon fibers (Vf) in the energy director part is preferably lower than the volume ratio of the carbon fibers (Vf) in the entire thermoplastic resin (Y).

Like in the above, this is because the presence of the carbon fibers that are discontinuous fibers and are two-dimensionally randomly oriented do not almost contribute toward the joining strength. By incorporating a large amount of a thermoplastic resin in the energy director part, the stability of the joining strength after ultrasonic application can be enhanced.

6.3 Shape of Energy Director

The shape of the energy director in the present invention is not specifically limited, and preferred shapes thereof are described in the section of "13. Mountain-Shaped Energy Director".

6.4 Number of Energy Directors

The number of the energy directors in the present invention is not specifically limited, and a necessary number of energy directors may be suitably arranged. A preferred number of the energy directors for controlling the projected area of the welded part after joining is described below.

7. Ultrasonic Welding

The fiber-reinforced plastic joined body of the present invention is produced by welding the fiber-reinforced molded article (X) having a joining surface (x) and the thermoplastic resin member (Y) having a joining surface (y) via the joining surface (x) and the joining surface (y), through ultrasonic application to the fiber-reinforced molded article (X).

Specifically, as shown in FIG. 1, the parts to be joined (the joining surface (x) and the joining surface (y)) of the surfaces of the fiber-reinforced molded article (X) (1 in FIG. 1) and the thermoplastic resin member (Y) (2 in FIG. 1) are set to face each other, ultrasonic is applied to the joined surfaces from the side of the fiber-reinforced molded article (X) (from the upper side of the paper plane of FIG. 1) to melt the thermoplastic resin, and then this is cooled to solidify the thermoplastic resin, and thus, the fiber-reinforced molded article (X) and the thermoplastic resin member (Y) are fixed to complete the joining of the two.

The ultrasonic welding in the present invention is a method of welding the bodies to be joined, in which a resonator called a welding horn (4 in FIG. 1) is pressed against the fiber-reinforced molded article (X) and high-frequency mechanical vibration is given by the resonator, and the mechanical vibration transferred to the fiber-reinforced molded article (X) is converted into frictional heat to fuse a part of the bodies to be joined, whereby the bodies are welded, and for example, this may be carried out using an ultrasonic welder (name of device: 2000Xdt, supplied by Branson Ultrasonics, Emerson Japan, Ltd.).

The control factors for welding through ultrasonic application include ultrasonic amplitude, ultrasonic application time, pressure on a sample, etc. With the increase in the ultrasonic amplitude, the ultrasonic application time, and the sample-pressing pressure, the joining strength tends to increase, but in consideration of the device to be used and the desired cycle time, the factors may be suitably controlled.

The control conditions in ultrasonic welding in the case of producing the fiber-reinforced plastic joined body of the present invention include welding time, amplitude, pressure, etc. As preferred conditions, the welding time may be within a range of 0.1 to 5 seconds, the amplitude may be 30 to 100 μm, and the pressure may be 500 to 2000 N. From the viewpoint of productivity in welding, more preferably, the welding time is within a range of 0.5 to 2 seconds and the pressure is 500 to 1500 N.

In the case where the position of the bodies to be joined is fixed and the welding position is thereby fixed in ultrasonic welding, a tool called an anvil may be used.

8. Tan δ by Viscoelastic Measurement of Fiber-Reinforced Molded Article (X)

8.1 Value of Tan δ

In the present invention, the maximum value of tan δ by viscoelastic measurement of the fiber-reinforced molded article (X) is less than 70% of the maximum value of tan δ by viscoelastic measurement of the thermoplastic resin contained in the fiber-reinforced molded article (X) within a range of the glass transition temperature ±100° C. of the thermoplastic resin contained in the fiber-reinforced molded article (X).

The vibration generated by ultrasonic application vibrates the molded article itself that is a subject for ultrasonic application. Welding is carried out by the vibration, and therefore for efficient welding by ultrasonic application, it is important how the vibration of the molded article by ultrasonic application is not attenuated by any way. The ultrasonic application in the present invention must be such that the parts to be joined are locally vibrated, heated and melted without melting the thermoplastic resin in the contact site with the welding horn (FIG. 1). Consequently, in the case of spot welding of the conventional technique (PTL 1) where the contact area between the welding horn and the bodies to be joined is melted, the problem of vibration attenuation as in the present invention does not exist, or the influence of vibration attenuation is extremely minor one.

Consequently, tan δ in viscoelastic measurement of the fiber-reinforced molded article (X) means vibration attenuation performance, and generally this is calculated by dividing the storage modulus by the loss modulus and is called a loss tangent. Controlling the loss tangent holds a major significance in ultrasonic welding.

In the case of welding by ultrasonic application to a molded article formed of a thermoplastic resin alone, the value of tan δ is too large and therefore the vibration of the molded article by ultrasonic application thereto attenuates. As opposed to this, the fiber-reinforced molded article (X) in the present invention can prevent attenuation of ultrasonic since the maximum value of tan δ by viscoelastic measurement of the fiber-reinforced molded article (X) is less than 70% of the maximum value of tan δ by viscoelastic measurement of the thermoplastic resin contained in the fiber-reinforced molded article (X) within a range of the glass transition temperature ±100° C. of the thermoplastic resin contained in the fiber-reinforced molded article (X), and in addition, even though the fiber-reinforced molded article (X) is thick, it can be welded by ultrasonic application within a short period of time.

The range of the glass transition temperature ±100° C. of the thermoplastic resin contained in the fiber-reinforced molded article (X) means that, in the case of a crystalline resin, the applied ultrasonic does not attenuate within a range up to the melting point (Tm) thereof.

Preferably, the maximum value of tan δ by viscoelastic measurement of the fiber-reinforced molded article (X) is 55% or less of the maximum value of tan δ by viscoelastic measurement of the thermoplastic resin contained in the fiber-reinforced molded article (X), more preferably 50% or less, even more preferably less than 45%.

Figure 2:
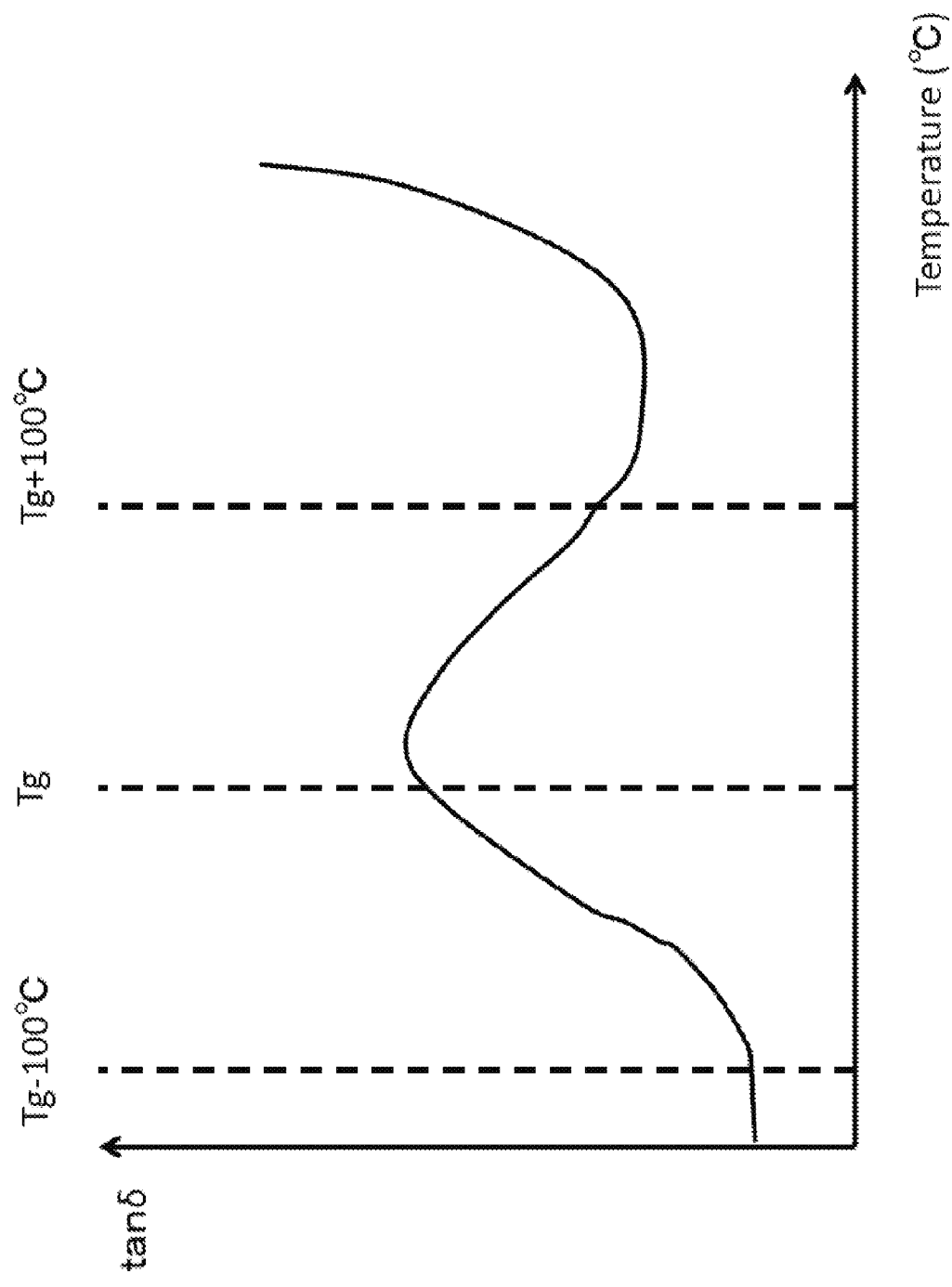
FIG. 2 is a schematic view showing a relationship between a temperature (of atmosphere in measurement) and tan δ of a fiber-reinforced molded article (X).

Tan δ of a fiber-reinforced molded article has temperature dependency, and an ordinary fiber-reinforced molded article exhibits a behavior as shown in FIG. 2.

8.2 Case where Thermoplastic Resin Contained in Fiber-Reinforced Molded Article (X) is Polyamide 6

In the case where the thermoplastic resin contained in the fiber-reinforced molded article (X) is polyamide 6 and where the maximum value of tan δ by viscoelastic measurement of the fiber-reinforced molded article (X) is 0.02 to 0.1 within a range of the glass transition temperature ±100° C. of the thermoplastic resin contained in the fiber-reinforced molded article (X), ultrasonic attenuation can be prevented, and even thick bodies can be joined by ultrasonic welding within a short period of time.

When the maximum value of tan δ is 0.1 or less, attenuation of ultrasonic vibration could be small therefore facilitating ultrasonic welding within a short period of time, and in particular, in such a case, ultrasonic welding of thick bodies is not difficult. Contrary to this, the molded article (X) whose maximum value of tan δ is 0.02 or more does not contain a large amount of carbon fibers, and therefore the flowability of thermoplastic resin in ultrasonic welding is good and the welding efficiency is thereby enhanced. The maximum value of tan δ of the molded article is preferably 0.05 to 0.09, more preferably 0.05 to 0.08, and even more preferably 0.05 to 0.07.

8.3 Case where Thermoplastic Resin Contained in Fiber-Reinforced Molded Article (X) is Polycarbonate In the case where the thermoplastic resin contained in the fiber-reinforced molded article (X) is polycarbonate and where the maximum value of tan δ by viscoelastic measurement of the fiber-reinforced molded article (X) is 0.6 to 1.0 within a range of the glass transition temperature ±100° C. of the thermoplastic resin contained in the fiber-reinforced molded article (X), ultrasonic attenuation can be prevented, and even thick bodies can be joined by ultrasonic welding within a short period of time.

When the maximum value of tan δ is 1.0 or less, attenuation of ultrasonic vibration could be small therefore facilitating ultrasonic welding within a short period of time, and in particular, in such a case, ultrasonic welding of thick bodies is not difficult. Contrary to this, the molded article (X) whose maximum value of tan δ is 0.6 or more does not contain a large amount of carbon fibers, and therefore the flowability of thermoplastic resin in ultrasonic welding is good and the welding efficiency is thereby enhanced. The maximum value of tan δ of the molded article is preferably 0.7 to 0.9.

8.4 Method for Control of Maximum Value of Tan δ by Viscoelastic Measurement of Fiber-Reinforced Molded Article (X)

The method for controlling the maximum value of tan δ by viscoelastic measurement of the fiber-reinforced molded article (X) is not specifically limited, but concretely, there are mentioned the content of the carbon fibers, the mechanical strength such as tensile strength, etc., the aspect ratio of the carbon fibers, etc. The aspect ratio may be obtained as (carbon fiber length/carbon fiber diameter), but by bundling the carbon fibers, the carbon bundles may be simulatively enlarged. In general, when the content of carbon fibers is larger, when the mechanical strength is higher, and when the aspect ratio is larger, the maximum value of tan δ tends to be smaller. In other words, in the case where the fiber-reinforced molded article (X) is produced by opening the carbon fibers to be therein, and where the above-mentioned average number (N) of the fibers increases, the maximum value of tan δ tends to increase within a range of the glass transition temperature ±100° C. of the thermoplastic resin contained in the fiber-reinforced molded article (X).

9. Application Surface of Fiber-Reinforced Molded Article (X)

The application surface of the fiber-reinforced molded article (X) is smooth.

Here, the smooth application surface means that the application surface does not have a fluctuation more than the maximum height of energy directors. For example, when the height of an energy director is 200 μm, the condition where the application surface does not fluctuate more than 200 μm is referred to as a smooth application surface. Having a smooth application surface, the produced joined body can have an improved surface appearance and ultrasonic application can be carried out efficiently.

10. Joining Morphology

In the fiber-reinforced plastic joined body of the present invention, the fiber-reinforced molded article (X) and the member (Y) are joined. Regarding the joining morphology, any other one member except the member (Y) may be joined to one fiber-reinforced molded article (X), or any other two or more members may be joined thereto. Further, other plural members (Y) may be joined to plural fiber-reinforced molded articles (X). The form of the joining part includes a linear form, a T-shaped form, an L-shaped form, a V-shaped form, an X-shaped form, an F-shaped form, an E-shaped form, an H-shaped form, an A-shaped form, a Y-shaped form, a U-shaped form, etc.

11. Joining Strength

The joining strength in the fiber-reinforced plastic joined body of the present invention is, as a tensile shear strength, 30 MPa or more. When the tensile shear strength is less than 30 MPa, a sufficient strength enough for us for structural members and the like would be difficult to realize.

12. Appearance of Joined Body

Figure 4:
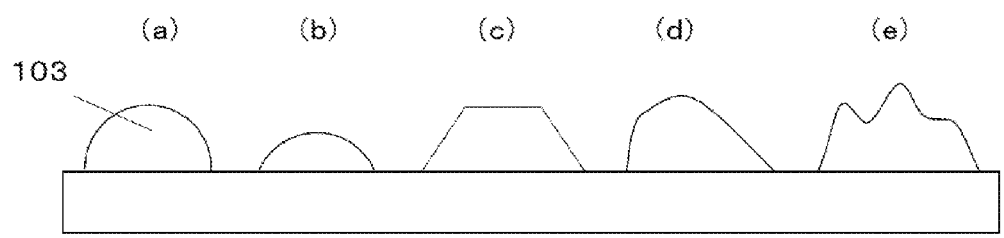
FIG. 4 is a schematic view showing examples of an energy director.
Figure 14A:
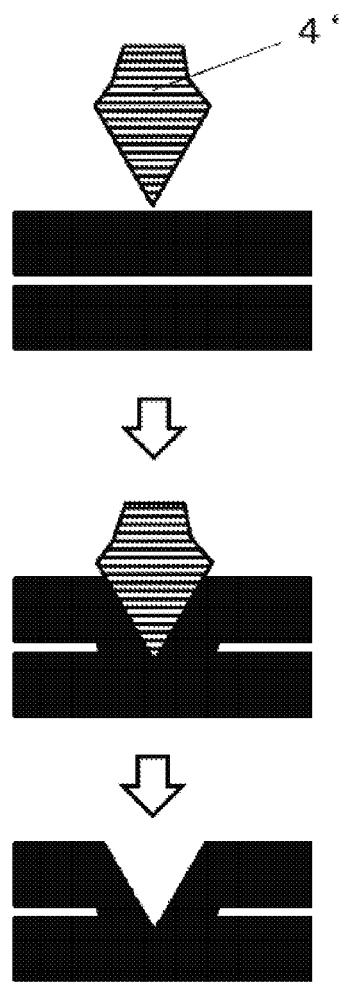
FIG. 14A includes schematic views showing an example of spot welding.
Figure 14B:
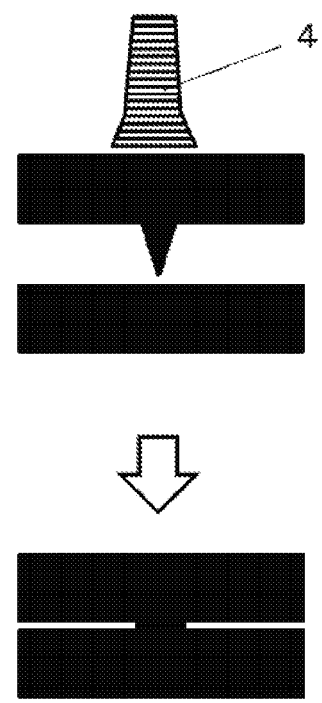
FIG. 14B includes schematic views showing an example of ultrasonic welding in which the surface of the resonator of the welding horn used in ultrasonic welding is flat.

In the case of using ultrasonic welding in the present invention, the surface appearance can be improved more than that of a spot-welded joined body. Specifically, a spot-welded joined body inevitably has holes having a diameter of 3 mm or so as depressions. On the other hand, in the ultrasonic welding in the present invention, the surface of the resonator called a welding horn that is kept in contact with the body to be joined is smooth, and therefore such depressions do not exist and the ultrasonically-welded surface is a substantially smooth surface. FIG. 14A shows a schematic view of spot welding. In FIG. 14A, 4' is a welding horn for spot welding, and in this case, the surface appearance worsens as compared with that in the case where a welding horn having a smooth surface is used (FIG. 14B).

13. Mountain-Shaped Energy Director

Next described is the case of using a mountain-shaped energy director.

Hereinunder in the column of "13. Mountain-Shaped Energy Director", the mountain-shaped energy director is one example of the energy directors described in the above sections "1 to 12". Unless otherwise specifically indicated, a mere expression of "energy director" means a mountain-shaped one and includes those satisfying the following (4) to (5).

(4) The mountain-shaped energy director has a convex part in the area from the base up to the top thereof.

(5) The mountain-shaped energy director has a transition interval from the top toward the base thereof where the cross-sectional area of the energy director in the direction of the joining surface increases.

(6) The amount of change in the area of the horizontal section of the energy director in the transition interval is 0.1 mm$^2$ or more per mm in the vertical direction relative to the joining direction.

13.1 Additional Challenges in the Invention

The above-mentioned PTL 2 (JP-A 2013-233729) discloses a technique of providing spaces on the surface and the back of energy directors themselves. Further, in general, in ultrasonic welding of a resin and another resin, energy directors are intensively vibrated and welded, and therefore the tip of the energy director has a sharp triangular form as in FIG. 9 (a) in most cases (for example, the above-mentioned PTL 3 (JP-A 2007-313778)). Recently, it has become desired to efficiently produce joined bodies having more excellent joining strength.

However, in the energy director described in PTL 2, the change in the area of the horizontal section from the top toward the base of the energy director is not always large, and therefore it is difficult to efficiently vibrate and melt the energy director. In addition, owing to the presence of a part with a void, the strength of the joined body is not always high.

On the other hand, in the case where the welding strength (joining strength) is desired to be increased by enlarging the welding volume of the energy directors having a sharp tip, as described in PTL 3, the energy director does not have a convex part in the area between the base to the top thereof and the height of the energy director is inevitably large, and accordingly, the dimensional stability of the joined body to be produced is poor.

Accordingly, still another object of the present invention is to provide a fiber-reinforced plastic joined body excellent in productivity, joining strength and dimensional stability.

13.2 Effect in Using Mountain-Shaped Energy Director

The fiber-reinforced plastic joined body of the present invention has realized improved dimensional stability while maintaining excellent productivity and joining strength, by ultrasonic welding using a specific energy director form.

13.3 Embodiment of Using Mountain-Shaped Energy Director

13.3.1 Energy Director

The energy director in the present invention exists on at least one joining surface of the joining surface (x) and the joining surface (y), and preferably satisfies the following (4) to (6).

(4) The mountain-shaped energy director has a convex part in the area from the base up to the top thereof.

(5) The mountain-shaped energy director has a transition interval from the top toward the base thereof where the cross-sectional area of the energy director in the direction of the joining surface increases.

(6) The amount of change in the area of the horizontal section of the energy director in the transition interval is 0.1 mm$^2$ or more per mm in the vertical direction relative to the joining direction.

13.3.2 Shape of Mountain-Shaped Energy Director

Preferably, the energy director in the present invention is a mountain-shaped energy director having a convex part in the area from the base up to the top thereof.

Figure 5:
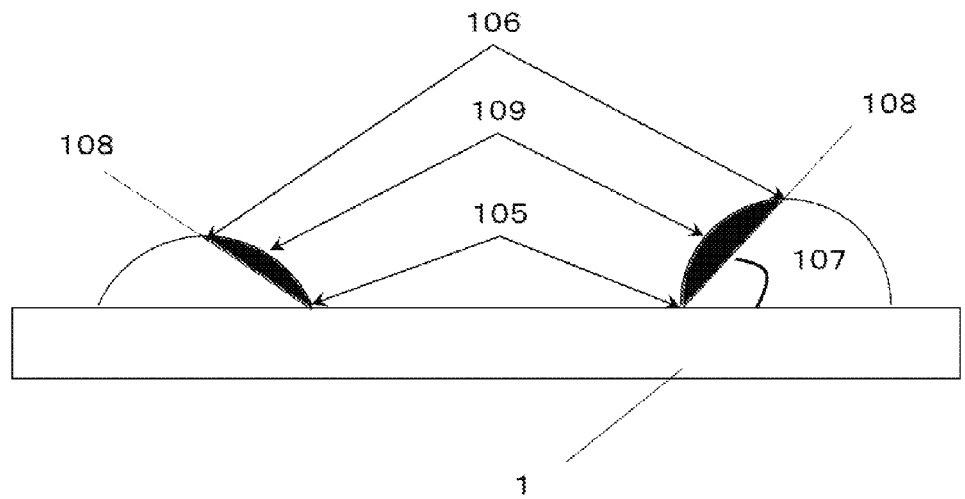
FIG. 5 is a schematic view of a shape having a convex part in the area from the base up to the center of the top of a mountain-shaped energy director.

The mountain shape is meant to indicate a cross-sectional shape of such that the cross section decreases from the skirt toward the top thereof, including a trapezoid, a semicircle, an arc (part of a circle or an oval), etc. Specific examples of the mountain shape are shown in FIG. 5.

Preferably, the shape of the mountain-shaped energy director is a semispherical or spherical crown-like one. Here, "spherical crown" is meant to indicate the curved part of a sphere or an oval cut through one plane, and in the case where a sphere or an oval is cut through a plane at the position separated from the center point thereof, the spherical crown is the part thereof not containing the center and having a smaller volume (for example, the shape of FIG. 4 (b) or FIG. 10 (a)).

The mountain-shaped energy director has a convex part in the area from the base to the top thereof. FIG. 5 shows examples of the energy director, having a base (105 in FIG. 5) and a top (106 in FIG. 5), and having a convex part shown by 109 in FIG. 5 when a straight line is drawn from the base to the top (108 in FIG. 5). Here, in the case of a mountain-shaped energy director not having a definite tip (apex) such as a truncated cone as in FIG. 4 (c) or FIG. 11, a linear line may be drawn from the base toward the center of the top of the shape.

In the case of forming the same welding volume, the height of the energy director having a convex part could be low as compared with that of the energy director not having a convex part. Accordingly, there does not occur so much change in the relative positional relationship between the fiber-reinforced molded article (X) and the thermoplastic resin member (Y), before and after the welding. As a result, as compared with that in the case where the relative positional relationship between (X) and (Y) at the start of ultrasonic application, the dimension and the dimensional stability of the joined body can be improved.

Figure 6A:
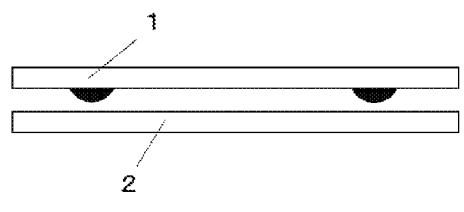
FIGS. 6A and 6B are schematic views showing the difference in the height of energy directors and the distance between a fiber-reinforced molded article (X) and a thermoplastic resin member (Y), depending on the difference in the shape of energy directors at the start of ultrasonic application.
Figure 6B:
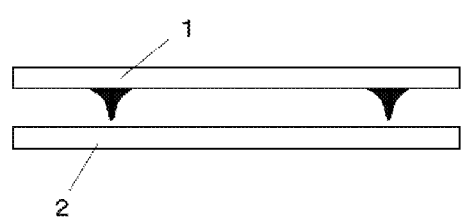
Figure 6C:
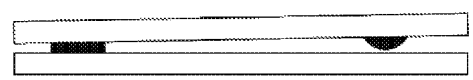
FIGS. 6C and 6D are schematic views after the first ultrasonic welding in the part of the energy director on the left side of the drawings.
Figure 6D:
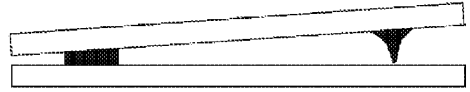
Figure 6E:
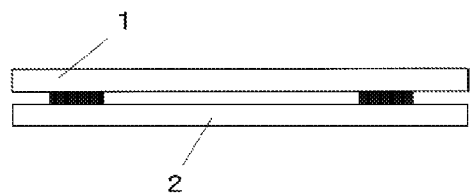
FIG. 6E is an example of a joined body whose dimensional stability is good after the second ultrasonic welding in the part of the energy director on the left side of the drawing.
Figure 6F:
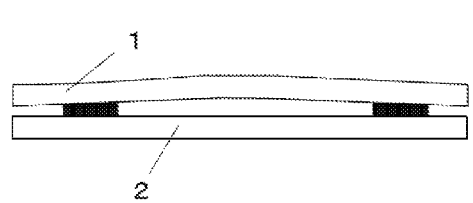
FIG. 6F is an example of a joined body whose dimensional stability has become bad after the second ultrasonic welding in the part of the energy director on the left side of the drawing.

For example, as shown in FIGS. 6A to 6F, in the case where two parts are ultrasonically welded in two times as divided, the joined body could be confirmed as to whether the dimensional stability thereof is good or bad. For example, in the case where the area around the left-side energy director is ultrasonically welded using a convex part-having mountain-shaped energy director as in FIG. 6A (FIG. 6C), and then the area around the right-side energy director is ultrasonically welded for subsequent welding, the dimensional stability is good and a joined body of FIG. 6E is obtained. On the other hand, for example, as in FIG. 6B, a high energy director whose volume is the same as the energy director in FIG. 6A provides a relative positional relationship that separates more the fiber-reinforced molded article (X) and the thermoplastic resin member (Y) at the start of ultrasonic welding, and therefore when the area around the left-side energy director is first ultrasonically welded and thereafter the area around the right-side energy director is ultrasonically welded, then the dimensional stability of the joined body becomes poor as in FIG. 6F. The fiber-reinforced molded article (X) shown by 1 in FIG. 6F is bent and joined, while the fiber-reinforced molded article (X) shown by 1 in FIG. 6E is not bent.

Figure 7A:
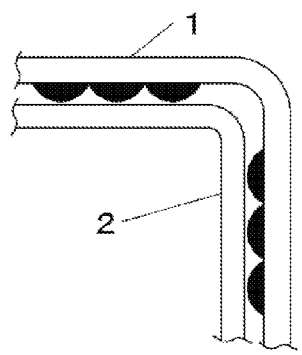
FIGS. 7A and 7B are schematic views showing the difference in the height of energy directors and the distance between a fiber-reinforced molded article (X) and a thermoplastic resin member (Y), depending on the difference in the shape of energy directors at the start of ultrasonic application.
Figure 7B:
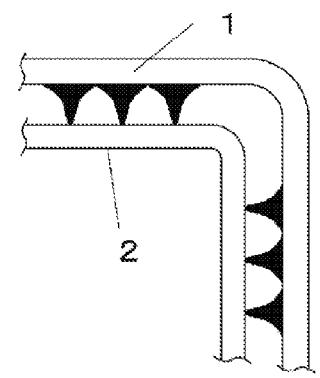
Figure 7C:
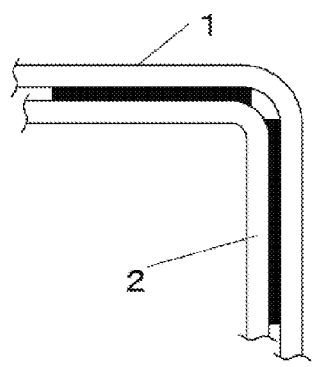
FIG. 7C is an example of a joined body having good dimensional stability.
Figure 7D:
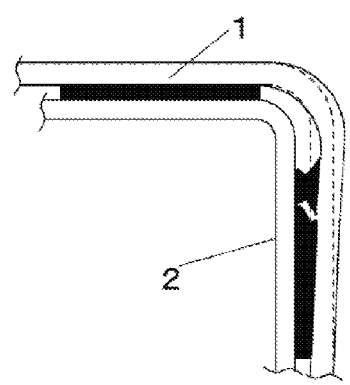
FIG. 7D is an example of a joined body having bad dimensional stability.

In particular, in the case where an L-shaped fiber-reinforced molded article (X) and a thermoplastic resin member (Y) are ultrasonically welded in two times as divided, the difference between good and bad dimensional stability is remarkable. For example, in the case of ultrasonic welding from the upper side of the paper plane using convex part-having mountain-shaped energy directors, for example, as shown in FIG. 7A, successively followed by ultrasonic welding from the right side of the paper plane, a joined body having good dimensional stability as in FIG. 7C is obtained. On the other hand, high energy directors whose volume is the same as that of the energy directors of FIG. 7A, for example, as in FIG. 7B, provide a relative positional relationship that separates more the fiber-reinforced molded article (X) and the thermoplastic resin member (Y) at the start of ultrasonic welding, and therefore when the upper side of the paper plane is first ultrasonically welded and then the right-hand side of the paper plane is thereafter ultrasonically welded, then the dimensional stability of the joined body becomes poor as in FIG. 7D.

The volume of the convex part (for example, 109 in FIG. 5) is preferably 5% or more of the total volume of the energy director for realizing the above-mentioned effect with ease, and more preferably 7% or more.

13.3.3 Cross-Sectional Area of Energy Director

Figure 8:
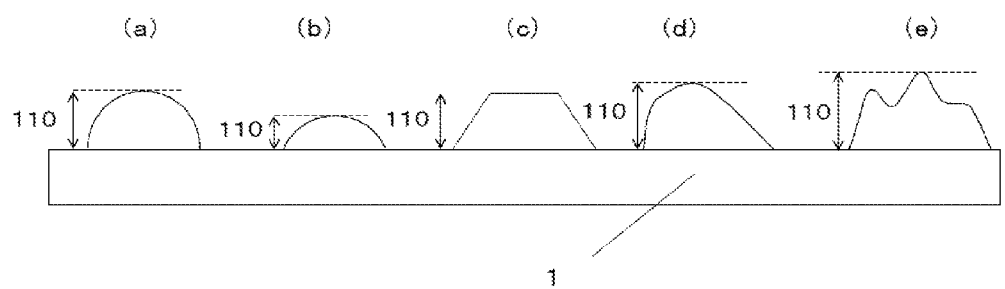
FIG. 8 shows schematic views showing a transition interval (110) of an energy director.

The mountain-shaped energy director that is a preferred embodiment in the present invention preferably has a transition interval from the top toward the base thereof where the cross-sectional area of the energy director in the direction of the joining surface increases. FIGS. 8 (a) to (e) show examples of the transition interval (110 in FIG. 8).

In the present invention, preferably, the amount of change in the area of the horizontal section of the energy director in the transition interval is 0.1 mm$^2$ or more per mm in the vertical direction relative to the joining direction.

Figure 9:
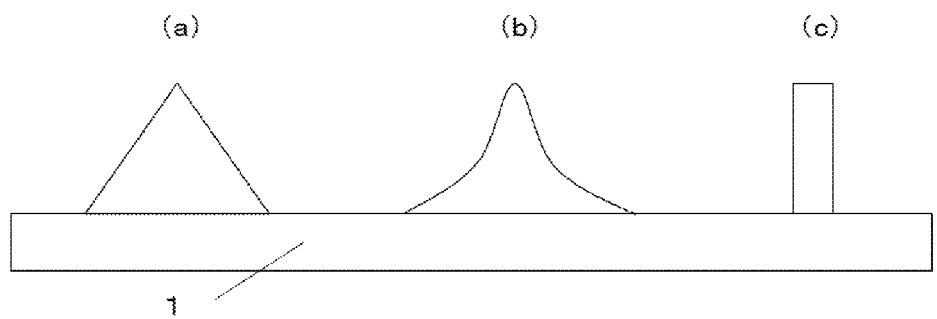
FIG. 9 shows schematic views (a), (b) and (c) as examples of an energy director in the present invention.

When a columnar energy director of FIG. 9 (c) where the amount of change in the area of the horizontal section of the energy director in the transition interval is less than 0.1 mm$^2$ in the vertical direction relative to the joining direction is provided, it would be difficult to locally vibrate and melt the energy director.

The amount of change in the area of the horizontal section of the energy director in the transition interval is preferably 0.5 mm$^2$ or more per mm in the vertical direction relative to the joining direction, more preferably 1 mm$^2$ or more per mm, even more preferably 1.5 mm$^2$ or more per mm, still more preferably 1.7 mm$^2$ or more per mm, most preferably 2.0 mm$^2$ or more per mm.

13.3.4 Preferred Form of Energy Director

Preferably, the mountain-shaped energy director that is a preferred embodiment in the present invention is in the form of an arc of such that the radius of curvature of the ridge line running toward the top (apex) thereof is 0.1 to 2 mm, and for example, energy directors of FIGS. 4 (a) and (b) are preferred.

When the radius of curvature of the energy director falls within the range, welding can be attained efficiently. When the radius of curvature is 0.1 mm or more, one energy director may be small and therefore an extremely large number of energy directors are not needed in welding a large area, and the molding could be easy. On the contrary, when the radius of curvature is 2 mm or less, the top of the energy director is not too dull so that the welding time is not long, and therefore the case is preferred. More preferably, the radius of curvature is 0.5 to 1.3 mm, even more preferably 0.5 to 0.8 mm.

At this time, the shape of the mountain-shaped energy director is preferably a semispherical or spherical crown-like one.

13.3.5 Preferred Projected Area of Energy Director

Preferably, the projected area of the mountain-shaped energy director that is a preferred embodiment in the present invention is 25 to 105% of the projected area of the welding part after joining. The projected area of the mountain-shaped energy director as referred to herein indicate the area of the projected plane of the energy director part as seen from the vertical direction of the joining surface of the mountain-shaped energy director. The projected area of the welded part means the area of the projected plane of the welded part as seen from the vertical direction of the joining surface in the finished fiber-reinforced plastic welded body.

Figure 15A:
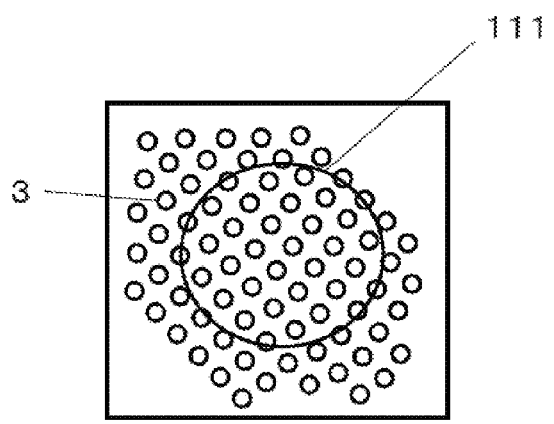
FIGS. 15A and 15B are schematic views showing examples of the size of a welding horn for use in ultrasonic welding, and the size and the number of mountain-shaped energy directors, as seen in the joining direction. Energy directors exist between a fiber-reinforced molded article (X) and a thermoplastic resin member (Y) and therefore they could not be seen in general, but for convenience sake, the energy directors are drawn so that the size and the number thereof relative to the welding horn could be known.
Figure 15A:
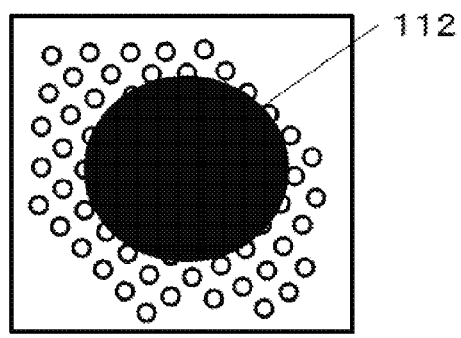
Figure 15B:
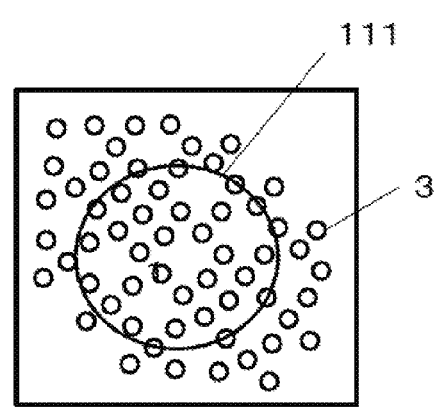
Figure 15B:
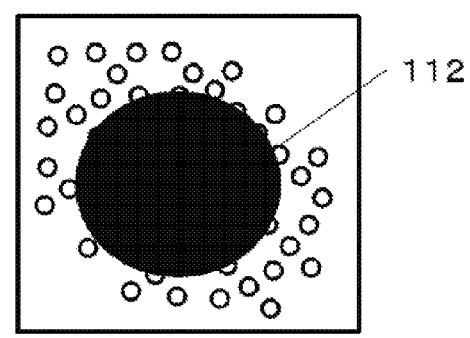

The ratio of the projected area of the mountain-shaped energy director to the projected area of the welded part after joining may be controlled by the size of the mountain-shaped energy director relative to the size of the welding horn to be used as well as by the number of the mountain-shaped energy directors. FIGS. 15A and 15B schematically show the size of the welding horn in ultrasonic welding, and the size and the number of the mountain-shaped energy directors. Just below the welding horn (111 in FIGS. 15A and 15B), the energy directors (1 in FIGS. 15A and 15B) are melted to give a welded part (weld area shown by 112 in FIGS. 15A and 15B). For example, as in FIG. 15A where the number of the mountains-shaped energy directors is increased, the projected area of the mountain-shaped energy directors is relatively large relative to the projected area of the welded part after joining, as compared with that in FIG. 15B.

When the projected area of the energy directors falls within the above range, the moldability and the weldability are well balanced. In the case where the projected area of the energy directors is 25% or more of the projected area of the welded part, and where plural energy directors are provided, the distance between them is not long and the welded part could be tightly formed with ease. Contrary to this, when the projected area is 105% or less, the welded resin can be sufficiently received therein in welding and therefore the probability of discharging out the resin as a giant burr could be reduced. Preferably, the projected area of the mountain-shaped energy directors is 35 to 95% of the welded part after joining, more preferably 40 to 90%, even more preferably 50 to 80%.

EXAMPLES

Examples are shown below, but the present invention is not limited to these.

1. Evaluation Methods

Values in the present Examples were determined according to the following methods.

(1) Measurement of Fiber Length
(Measurement of Average Fiber Length of Fibers Contained in Molded Article Obtained by Press-Molding)

Measurement of the average fiber length of carbon fibers was as follows: The fiber length of 100 fibers randomly extracted from a molded plate was measured to a unit of 1 mm using a caliper, and from the length (Li) of all the carbon fibers measured, the average fiber length (La) was calculated according to the following formula (3). The formula (3) is a calculation method for weight-average fiber length, and in the case of cutting fibers to have a predetermined length, using a rotary cutter, this is the same as the value calculated for number-average fiber length (above-mentioned formula (2)).

$$La = (\Sigma Li^2)/(\Sigma Li) \qquad \text{Formula (3)}$$

(Measurement of Average Fiber Length of Fibers Contained in Molded Article Obtained by Injection Molding)

A test piece of 20 mm×10 mm was cut out of the obtained molded article, and heated in an oxygen atmosphere at 550° C. for 1.5 hours to fire and remove the resin component. The remaining carbon fibers were put into water containing a surfactant, and fully stirred by ultrasonic vibration. The stirred dispersion was randomly collected using a measuring spoon to prepare test samples. Using an image analyzer, Luzex AP supplied by Nireco Corporation, the length of 3000 fibers in each sample was measured, and the data were averaged to give the weight-average fiber length of the carbon fibers in the molded article.

(2) The fiber bundles in the molded plate were analyzed according to the method described in WO 2012/105080.

(3) The tensile shear strength of the fiber-reinforced plastic joined body was measured according to No. M406-87 issued by The Society of Automotive Engineers of Japan (JSAE)) in March 1987. Specifically, for measuring the tensile shear strength, the test piece size was 25 mm×100 mm×2.5 mm, and the tension rate was 5 mm/sec.

(4) Tan δ by viscoelastic measurement of the fiber-reinforced molded article (X) was measured according to JIS K7244-5 (1999). The frequency of the vibration mode in measurement was 100 Hz, and the maximum value within a range of the glass transition temperature ±100° C. of the thermoplastic resin contained in the fiber-reinforced molded article (X) was determined.

(5) Volume Ratio of the Carbon Fibers (Vf)

The volume ratio of the carbon fibers (Vf) in the fiber-reinforced molded article was determined according to the definition of the following formula (1).

$$Vf = 100 \times (\text{volume of carbon fibers})/(\text{volume of carbon fibers} + \text{volume of thermoplastic resin}) \qquad \text{Formula (1)}$$

Regarding Vf in the energy director part, 100 energy directors were cut out of the molded article and analyzed in the same manner as above.

(6) Dimensional stability after ultrasonic welding was evaluated according to the following criteria.

In the molded article (X) and the member (Y) each having a bent part as shown in FIGS. 7A and 7B, both sides sandwiching the bent part were ultrasonically welded by ultrasonic application to the molded article (X) from the upper side of the paper plane in FIGS. 7A and 7B, followed by ultrasonic application to the molded article (X) from the right-hand side of the paper plane.

A (Excellent): There occurred little strain in the bent part of the molded article (X).
B (Good): Some strain was confirmed in the bent part of the molded article (X).
C (Better): Much strain was observed in the bent part of the molded article, but the sample is practicable in some use.
D (Bad): Significant strain occurred in the bent part of the molded article (X), and the part noticeably deviated from the shape of the molded article (X) before joining or many energy directors remained as unmelted near the bent part.

(7) Projected Area of Welded Part

From the obtained fiber-reinforced plastic joined body, the thermoplastic resin member (Y) was peeled and observed with the naked eye in the vertical direction relative to the joining surface, and the longest axis in the welded area after ultrasonic application, as the long side, and the axis perpendicular to the long side, as the short side, were individually measured to a unit of 1/10 mm using a ruler, and the area was calculated as an oval area.

(9) Evaluation of Stability in Ultrasonic Welding

Ultrasonic welding was carried out continuously in 30 sites, and evaluated according to the following criteria.
Excellent: In every site, ultrasonic welding was carried out with no problem, or there occurred only one defect.
Good: In 2 to 4 sites, ultrasonic welding was not completely finished, and some energy directors remained as unmelted therein.
Bad: In 5 or more site, ultrasonic welding was not completely finished, and some energy directors remained as unmelted therein.

2. Production Examples

Production examples for samples are described below.

2.1 Production Example 1

Carbon fibers "Tenax" (registered trademark) STS40-24KS (average fiber diameter 7 μm) available from Toho Tenax Co., Ltd., which had been cut to have an average fiber length of 30 mm, were used as carbon fibers. As a thermoplastic resin, nylon 6 resin A1030 (glass transition temperature 50° C.) available from Unitika Ltd. was used. According to the method described in WO 2012/105080, a nylon 6 resin-containing carbon fiber mat having a carbon fiber areal weight of 1800 g/m$^2$ and a nylon 6 resin areal weight of 1500 g/m$^2$ was produced, in which carbon fibers were isotropically aligned. The carbon fibers were cut to have a fiber length of 30 mm.

As nylon 6 resin, "A1030BRF-BA" available from Unitika Ltd. was used, and a master batch mixed with carbon black (oil furnace carbon black, available from Cabot Japan Corporation, "BLACK PEARLS 800", average primary particle diameter 17 nm, sulfur content 0.5 wt %) was prepared, and the master batch and the nylon 6 resin pellets were compounded to give a mixture having a carbon black content of 1.8 wt %, and this was ground and used here.

The nylon 6 resin mixture was stripe-like deposited on the cut carbon fibers. With that, a mat-shaped isotropic base material of a mixture of the carbon fibers and the thermoplastic resin was formed on a fixing net. The carbon fibers in the isotropic base material were two-dimensionally randomly dispersed and oriented.

The isotropic base material was heated in a pressing device heated at 260° C., using an upper mold having a concave portion, at 2.0 MPa for 5 minutes to give a tabular molded plate having a thickness of 2.3 mm. The carbon fibers in this molded plate contained, single fibers and partly-opened fiber bundles, as mixed therein. The carbon fibers were isotropically dispersed in the plane direction of the molded plate. The critical number of single fiber was 86, the average number of fibers was 880, and the ratio by volume of the carbon fiber bundles (A) constituted by the critical number of single fiber or more was 85 vol %.

The resultant molded plate was cut out into a size of 390 mm×390 mm, dried in a hot air drier at 120° C. for 4 hours, and then further heated up to 280° C. using an IR heater. A mold engraved to form spherical crown-like energy directors as shown by 3 in FIG. 1 was prepared, and the mold was set at 140° C., and the molded plate heated in the above was introduced into the mold. Subsequently, this was pressed under a pressure of 5 MPa for 1 minute to give a tabular molded article (I) of 400×400×2.3 mm. This was cut into pieces of 25 mm×100 mm. The energy directors were spherical crown-like ones having a radius of curvature of 0.57 mm and a height of 0.3 mm.

100 energy directors were cut out, and Vf of the part thus cut out was measured to be 13% on average. The results are shown in Table 1.

2.2 Production Example 2

A molded article (II) having a volume ratio of carbon fibers of 34% was produced in the same manner as in Production Example 1, except that the carbon fiber areal weight was 1200 g/m$^2$ and the nylon 6 resin areal weight was 1500 g/m$^2$. The results are shown in Table 1.

2.3 Production Example 3

A molded article (III) having a volume ratio of carbon fibers of 20% was produced in the same manner as in Production Example 1, except that the carbon fiber areal weight was 600 g/m$^2$ and the nylon 6 resin areal weight was 1500 g/m$^2$. The results are shown in Table 1.

2.4 Production Example 4

As carbon fibers, 100 parts by weight of carbon fibers "Tenax" (registered trademark) STS40-24KS available from Toho Tenax Co., Ltd, which had been cut to have an average fiber length of 20 mm, and as a thermoplastic resin, 320 parts by weight of nylon 6 resin A1030 available from Unitika Ltd. were put into a twin-screw kneading extruder, and kneaded thereto to prepare a fiber-reinforced resin composition. In this resin composition, the carbon fibers were in the form of single fibers, and the volume ratio of the carbon fibers was 17%. Using the resultant, fiber-reinforced resin composition and using a 110-ton electric-powered injection-molding machine supplied by The Japan Steel Works, Ltd. (JSW180H by The Japan Steel Works, Ltd.), the resin composition was introduced into the mold of 100×100 mm of the machine to produce a molded article (IV) of 100× 100×2.3 mm. Energy directors were integrally molded during injection molding, and Vf of the energy directors was measured in the same manner as in Example 1, and was 15%. The fiber length of the carbon fibers was 0.9 mm. The results are shown in Table 1.

2.5 Production Example 5

An aromatic condensed phosphate, bisphenol A bis(diphenyl phosphate) (CR-741 available from Daihachi Chemical Industry Co., Ltd.) was used as an impregnation assistant, and in an emulsion prepared by emulsifying this to have a nonvolatile content of 12% by mass, PAN carbon fiber filaments (ST540 available from Toho Tenax Co., Ltd.) as carbon fiber bundles were introduced to pass therethrough, and then the excessively-adhered emulsion was removed with nip rolls, and further, the fibers were introduced into a hot air drier heated at 180° C. to pass therethrough taking 2 minutes, and were thus dried. The easily penetrable carbon fiber bundles thus obtained according to the above-mentioned treatment were coated with a polycarbonate (L-1225Y available from Teijin Ltd.), using a wire-coating cross head die having an outlet diameter of 3 mm, and these were cut into a length of 6 mm to thereby produce a molding material of core/shell pellets suitable for injection molding, having a volume ratio of carbon fibers of 25%, a diameter of 3.2 mm and a length of 6 mm. Using the molding material and using a 110-ton electric-powered injection-molding machine (J110AD) supplied by The Japan Steel Works, Ltd., the material was introduced into the mold of 100×100 mm of the machine to produce a molded article (V) of 100× 100×2.3 mm. Energy directors were integrally molded during injection molding.

The volume ratio of the carbon fibers in the molded article (V) was 25%, and Vf of the energy directors was measured in the same manner as in Example 1, and was 23%. The average fiber length in the molded article was 0.9 mm. The results are shown in Table 1.

2.6 Production Example 6

A molded article (VI) was produced in the same manner as in Production Example 5, except that the volume ratio of the carbon fibers in the core/shell pellets was 15%. The results are shown in Table 1.

2.7 Production Example 7

A molded article (VII) was produced in the same manner as in Example 1, except that the resin to be used was changed to a polycarbonate (L-1225Y available from Teijin Ltd.). The results are shown in Table 1.

2.8 Production Example 8

A molded article (VIII) was produced in the same manner as in Production Example 1, except that the energy directors were not integrally molded during press-molding but were formed by injection-molding a carbon fiber-reinforced resin onto the tabular molded plate. Vf of the entire molded article (VIII) and Vf of the energy director part were both 43%. The results are shown in Table 1.

2.5 Reference Production Example 1

A molded plate (IX) was produced in the same manner as in Production Example 1 except that the carbon fiber areal weight was 150 g/m$^2$, the nylon 6 resin areal weight was 1500 g/m$^2$, and the volume ratio of the carbon fibers was 6%. The results are shown in Table 1.

2.5 Reference Production Example 2

Using carbon fibers "Tenax" (registered trademark) STS40-24KS available from Toho Tenax Co., Ltd. as carbon fibers, and using nylon 6 resin A1030 available from Unitika Ltd. as a thermoplastic resin, a mat having a carbon fiber areal weight of 1800 g/m$^2$ and a nylon resin areal weight of 1500 g/m² was produced in which the carbon fibers were randomly oriented. Using a pressing machine, the mat was heated in the mold heated at 260° C. and having a concave portion on the application surface thereof, under 2.0 MPa for 5 minutes, thereby producing a tabular molded article (X) with t=2.3 mm.

Regarding the resultant molded article (X), the critical number of single fiber thereof defined by the above-mentioned formula (a) was 86, the average number of single fibers (N) in the carbon fiber bundles (A) constituted by the critical number of single fiber or more was 420, and the ratio by volume of the carbon fiber bundles (A) constituted by the critical number of single fiber or more was 85 vol %. The volume ratio of the fibers in the resultant molded article (X) was 43 vol %.

The average fiber length of the carbon fibers in the resultant random mat was 12 mm, and fiber bundles having a thickness of 100 µm or more were not detected. Vf of the energy director part was 43% and was the same as Vf of the entire molded article (X). The results are shown in Table 1.

2.6 Reference Production Example 3

An intermediate material prepared by infiltrating a thermoplastic resin PA6 (nylon 6 resin, available from Ube Industries, Ltd.) as a matrix resin into a nonwoven fabric base material prepared by needle-punching carbon fibers "Tenax" (registered trademark) STS40-24KS available from Toho Tenax Co., Ltd. was heated at 260° C. for 10 minutes, while given a pressure of 0.1 MPa by a press-molding machine. By the compression molding, a molded article (molded article XI) was produced having a thickness of 3.0 mm and Vf of 28%. Since uncut continuous carbon fibers were used, the ratio of bundles and the average number of fibers (N) were not measured.

2.7 Reference Production Example 4

A molded article (XII) was produced in the same manner as in Production Example 1, for which, however, energy directors were not produced in press-molding. The results are shown in Table 1.

2.8 Others

Nylon 6 resin (A1030 available from Unitika Ltd.) alone, or polycarbonate (L-1225Y available from Teijin Ltd.) alone was press-molded to produce molded plates. Tan δ was determined in the same manner as that of the above-mentioned fiber-reinforced resin. The results are shown in Table 1.

Figure 3:
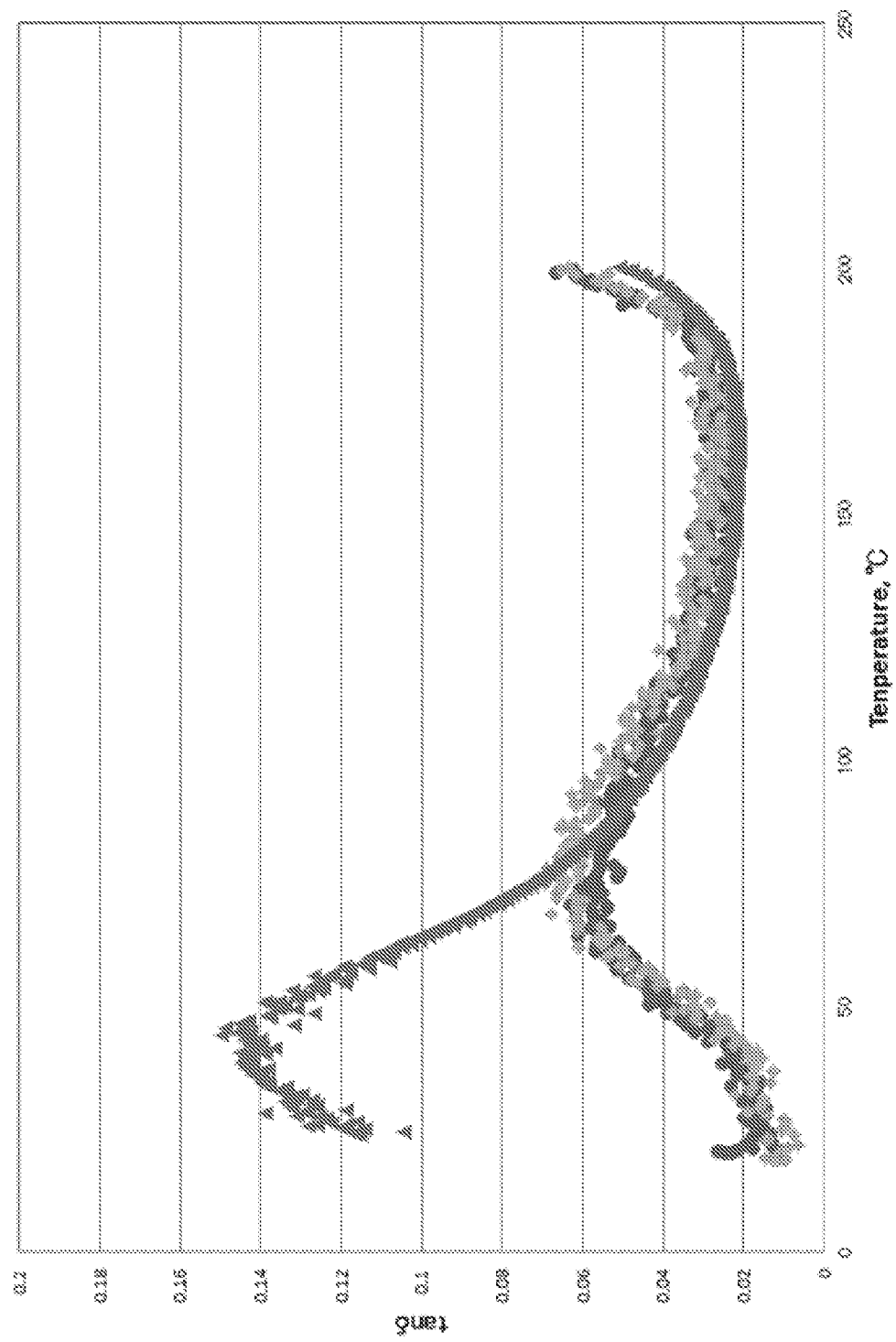
FIG. 3 shows measurement results of "temperature–tan δ" of various samples using a polyamide as the thermoplastic resin contained in a fiber-reinforced molded article (X).

2.9 The molded article (II), the molded article (IV), and nylon 6 resin alone were referred to as Sample 1, Sample 2 and Sample 3, respectively, and tan δ thereof was measured. The data are plotted in the graph of FIG. 3.

3. Molded articles were produced below, for which the shape of the mountain-shaped energy directors was changed.

3.1 Production Example 201

In the same manner as in Example 1 except that the average number of fibers was controlled to be 420, a mold engraved to form plural, spherical crown-like energy directors as shown by FIG. 4 (b) was prepared, and the mold was set at 140° C., and the above-mentioned, hot molded plate was introduced into the mold. Next, this was pressed under a pressure of 5 MPa for 1 minute to produce a molded article of 400×400×2.3 mm. From this, pieces of molded articles (X201) of 25 mm×100 mm were cut out to contain the energy directors. Values of the radius of curvature of the energy directors provided in the molded article, and also the height, the volume and the cross-sectional area change thereof are shown in Table 3.

For evaluation of dimensional stability, a molded article (X201') shown by 1 in FIG. 7A was prepared separately.

The ratio of the projected area of the mountain-shaped energy directors to the projected area of the welded part after joining was so planned as to be 67% by controlling the number of the mountain-shaped energy directors relative to the size of the welding horn.

3.2 Production Example 202

Figure 11:
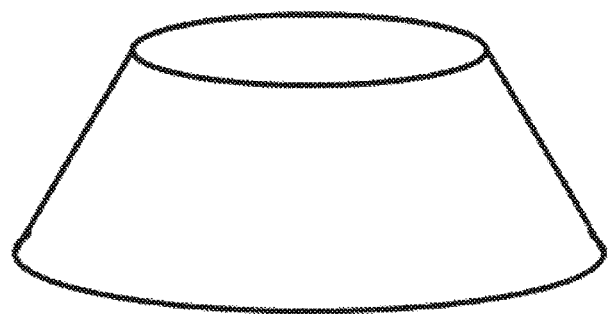
FIG. 11 is a schematic view showing a pudding-shaped energy director as an example in the present invention.

A molded article (X202) and a molded article (X202') were produced in the same manner as in Production Example 1 except that the shape of the energy directors was changed to a pudding-like one shown by FIG. 4 (c) and FIG. 11.

3.3 Production Example 203

A molded article (X203) and a molded article (X203') were produced in the same manner as in Production Example 201 except that spherical crown-like energy directors shown in Table 3 were used.

3.4 Production Example 204

A molded article (X204) and a molded article (X204') were produced in the same manner as in Production Example 201 except that spherical crown-like energy directors shown in Table 3 were used.

3.5 Production Example 205

A molded article (X205) and a molded article (X205') were produced in the same manner as in Production Example 201 except that semispherical energy directors shown in Table 3 were used.

3.6 Production Example 206

A molded article (X206) and a molded article (X206') were produced in the same manner as in Production Example 202 except that pudding-like energy directors shown in Table 3 were used.

3.7 Production Example 207

A molded article (X207) and a molded article (X207') were produced in the same manner as in Production Example 201 except that the ratio of the projected area of the mountain-shaped energy directors to the projected area of the welded part was planned to be 30% by reducing the number of the energy directors.

3.8 Production Example 208

A molded article (X208) and a molded article (X208') were produced in the same manner as in Production Example 201 except that the ratio of the projected area of the mountain-shaped energy directors to the projected area of the welded part was planned to be 20% by further reducing the number of the energy directors.

3.9 Production Example 209

Figure 10:
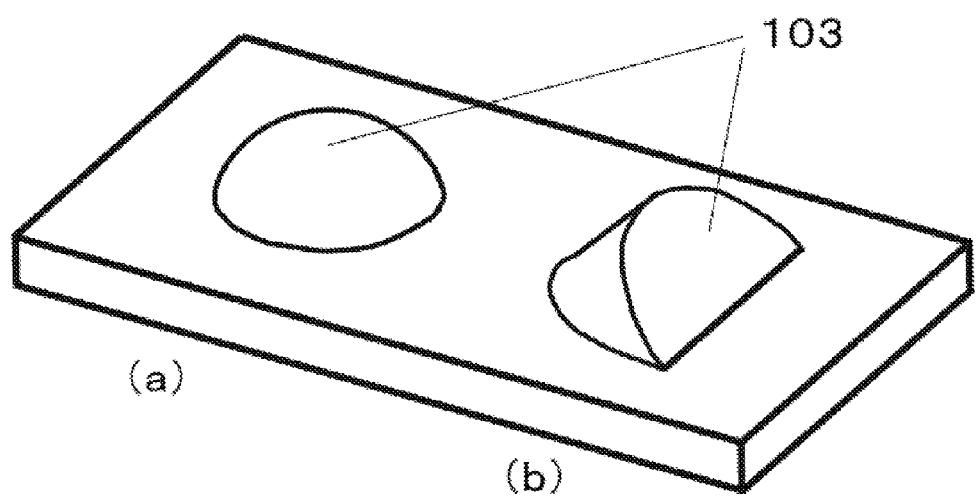
FIG. 10 is a schematic view of three dimensional figures (examples) of an energy director in the present invention.

A molded article (X209) and a molded article (X209') were produced in the same manner as in Production Example 201 except that the energy directors were so planned as to have the shape shown by FIG. 10 (*b*) and to have the height, the volume and the cross-sectional area change shown in Table 3.

3.10 Production Example 210

Figure 12:
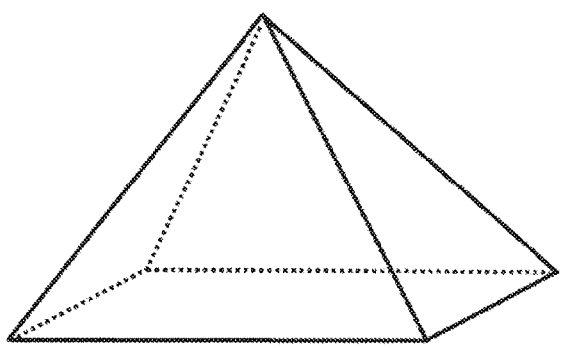
FIG. 12 is a schematic view showing a square pyramid-shaped energy director as an example in the present invention.

A molded article (X210) was produced in the same manner as in Production Example 1 except that the shape of the energy directors was changed to one having a cross section of FIG. 9 (*a*) (square pyramid energy directors as in FIG. 12). For evaluation of dimensional stability, a molded article (X210') shown by 1 in FIG. 7B was prepared. As shown by FIG. 9 (*a*) and FIG. 12, the mountain-shaped energy directors used in Production Example 210 do not have a convex part from the base to the top thereof.

3.11 Production Example 211

Figure 13:
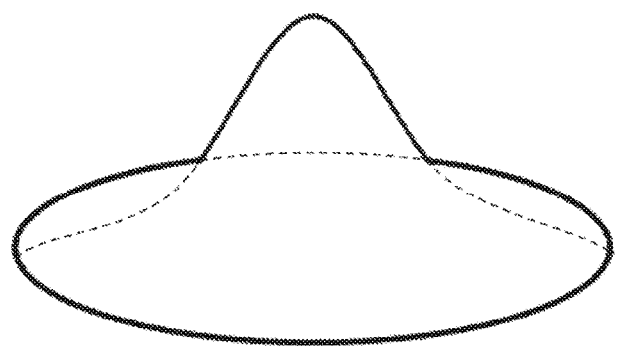
FIG. 13 is a schematic view showing one example of an energy director.

A molded article (X211) was produced in the same manner as in Production Example 1 except that the shape of the energy directors was changed to one having a cross section of FIG. 9 (*b*) (energy directors having a shape as in FIG. 13). For evaluation of dimensional stability, a molded article (X211') shown by 1 in FIG. 7B was prepared. As shown by FIG. 9 (*b*) and FIG. 13, the mountain-shaped energy directors used in Production Example 211 do not have a convex part from the base to the top thereof.

3.11 Reference Production Example 301

A molded article (Y301) was produced in the same manner as in Production Example X201 except that no energy director was provided. For evaluation of dimensional stability, a molded article (Y301') shown by 2 in FIG. 7A was prepared similarly.

5. Examples and Comparative Examples

5.1 Example 1

The molded article (I) and the molded article (XII) were layered as in FIG. 1, and using an ultrasonic welder (2000Xdt supplied by Branson Ultrasonics, Emerson Japan, Ltd.), ultrasonic was applied thereto from the side of the molded article (I) as directed to the part of the molded article (I) where the energy directors exist, thereby giving a fiber-reinforced joined body. Regarding the welding condition, the welding time was 1 second, the amplitude was 60 µm, the pressure was 1 kN, and the frequency was 20 kHz. The results are shown in Table 2.

5.2 Example 2

A fiber-reinforced plastic joined body was produced in the same manner as in Example 1 except that the molded article (II) produced in Production Example 2 was used in place of the molded article (I). The results are shown in Table 2.

5.3 Example 3

A fiber-reinforced plastic joined body was produced in the same manner as in Example 1 except that the molded article (III) produced in Production Example 3 was used in place of the molded article (I). The results are shown in Table 2.

5.4 Example 4

A fiber-reinforced plastic joined body was produced in the same manner as in Example 1 except that the molded article (IV) produced in Production Example 4 was used in place of the molded article (I). The results are shown in Table 2.

5.5 Examples 5 to 7

Fiber-reinforced plastic joined bodies were produced in the same manner as in Example 1 except that the molded article (V), the molded article (VI) and the molded article (VII) produced in Production Examples 5 to 7 were used in place of the molded article (I). The results are shown in Table 2.

5.5 Example 8

A fiber-reinforced plastic joined body was produced in the same manner as in Example 1 except that the molded article (VIII) produced in Production Example 8 was used in place of the molded article (I). Since Vf of the energy directors was larger than that in the molded article (I), the tensile shear strength lowered. The results are shown in Table 2.

5.6 Example 9

A fiber-reinforced plastic joined body was produced in the same manner as in Example 1 except that the molded article (XII) was used as the fiber-reinforced molded article (X) and the molded article (I) was as the thermoplastic resin member (Y), and the molded articles (I) and (XII) were layered, in which ultrasonic was applied from the side of the molded article (XII) to the molded article (I) in the area thereof corresponding to the part where the energy director exist. The results are shown in Table 2.

5.7 Comparative Example 1

A fiber-reinforced plastic joined body was produced in the same manner as in Example 1 except that the molded article (IX) produced in Reference Production Example 1 was used in place of the molded article (I). The results are shown in Table 2.

5.8 Comparative Example 2

A fiber-reinforced plastic joined body was produced in the same manner as in Example 1 except that the molded article (X) produced in Reference Production Example 2 was used in place of the molded article (I). The results are shown in Table 2. The application surface of the molded article (VI) has a concave portion, and the surface appearance of the application surface was poor.

5.9 Comparative Example 3

A fiber-reinforced plastic joined body was produced in the same manner as in Example 1 except that the molded article (XI) produced in Reference Production Example 3 was used in place of the molded article (I). The results are shown in Table 2.

5.10 Comparative Example 4

Two sheets of the molded article (XII) were prepared, and using an ultrasonic welder equipped with a welding horn having a diameter of 10 mm, 2000LPt supplied by Branson Ultrasonics, Emerson Japan, Ltd., these were ultrasonically welded at a frequency of 20 kHz and under a pressure of 0.2 MPa for about 10 seconds until the upper part could sink by 2 mm from the top. The welding was carried out in 3 sites on one side and in 6 sites on both sides thereby giving a fiber-reinforced plastic joined body. Holes were formed in the parts in which the welding horn was applied under pressure, and therefore the outward appearance of the joined body was poor (see FIG. 14A).

6. Using various types of molded articles in which the shape of the mountain-shaped energy directors was varied, joined bodies were produced.

6.1 Example 10

Two sheets of a molded article (X201) having energy directors and a molded article (Y301) were ultrasonically welded using 2000Xdt supplied by Branson Ultrasonics, Emerson Japan, Ltd., via the energy directors-having surface of the former.

For evaluation of dimensional stability, the molded article (X201') and the molded article (Y301') were ultrasonically welded. The results of the resultant fiber-reinforced plastic joined body are shown in Table 1.

6.2 Example 11

A fiber-reinforced plastic joined body was produced in the same manner as in Example 1 except that the molded article (X202) and the molded article (X202') were used. The shape of the welded area was oval. The results are shown in Table 1.

6.3 Examples 12 to 14

Fiber-reinforced plastic joined bodies were produced in the same manner as in Example 1 except that the molded article (X203), the molded article (X204) and the molded article (X205) were used. For evaluation of dimensional stability, the molded article (X203'), the molded article (X204') and the molded article (X205') were used.

The results are shown in Table 2.

6.4 Example 15

Fiber-reinforced plastic joined bodies were produced in the same manner as in Example 1 except that the molded article (X206) and the molded article (X206') were used. The results are shown in Table 1.

6.5 Examples 16 to 17

Fiber-reinforced plastic joined bodies were produced in the same manner as in Example 1 except that the molded article (X207) and the molded article (X208) were used. For evaluation of dimensional stability, the molded article (X207') and the molded article (X208') were used.

6.6 Example 18

A fiber-reinforced plastic joined body was produced in the same manner as in Example 1 except that the molded article (X209) was used. For evaluation of dimensional stability, the molded article (X209') was used.

6.7 Example 19

A fiber-reinforced plastic joined body was produced in the same manner as in Example 1 except that the molded article (X210) and the molded article (X210') were used. The results are shown in Table 1.

6.8 Example 20

A fiber-reinforced plastic joined body was produced in the same manner as in Example 1 except that the molded article (X211) and the molded article (X211') were used. The shape of the welded area was oval. The results are shown in Table 1.

TABLE 1

|  | Production Example 1 | Production Example 2 | Production Example 3 | Production Example 4 | Production Example 5 | Production Example 6 | Production Example 7 | Production Example 8 |
|---|---|---|---|---|---|---|---|---|
| Molded Article | I | II | III | IV | V | VI | VII | VIII |
| Fiber Length mm | 30 | 30 | 30 | 0.9 | 0.9 mm | 0.9 mm | 30 | 30 |
| Ratio of Bundles Vol % | 85 | 85 | 85 | 0 | 0 | 0 | 85 | 85 |
| Average Number of Fibers N | 880 | 880 | 880 | 1 | 1 | 1 | 880 | 880 |
| Volume Ratio of Carbon Fibers Vf | 43 | 34 | 20 | 17 | 25 | 15 | 43 | 43 |
| Thermoplastic Resin | nylon 6 | nylon 6 | nylon 6 | nylon 6 | PC | PC | PC | nylon 6 |
| Content of Carbon Black relative to Thermoplastic Resin | 1.8 wt % | 1.8 wt % | 1.8 wt % | 1.8 wt % | 0 | 0 | 1.8 wt % | 1.8 wt % |
| Production Method for Molded Article | press molding | press molding | press molding | injection molding | injection molding | injection molding | press molding | press molding |
| Energy Director | yes | yes | yes | yes | yes | yes | yes | yes |
| Vf | 13 | 10 | 6 | 15 | 23 | 14 | 13 | 43 |
| Production Method | integrated in molding | integrated in molding | integrated in molding | integrated in molding | integrated in molding | integrated in molding | integrated in molding | separately formed and fixed |
| Condition of Application Surface | smooth | smooth | smooth | smooth | smooth | smooth | smooth | smooth |

TABLE 1-continued

| tan δ | | | | | | | | |
|---|---|---|---|---|---|---|---|---|
| tan δ by Viscoelastic Measurement | 0.055 | 0.063 | 0.068 | 0.069 | 0.830 | 0.791 | 0.789 | 0.055 |
| Ratio of the maximum value of tan δ by viscoelastic measurement of molded article, to the maximum value of tan δ by viscoelastic measurement of thermoplastic resin contained in molded article (%) | 36% | 42% | 45% | 46% | 52% | 50% | 50% | 36% |
| Remarks | | | | | | | | |

| | Reference Production Example 1 | Reference Production Example 2 | Reference Production Example 3 | Reference Production Example 4 | Nylon 6 | PC |
|---|---|---|---|---|---|---|
| Molded Article | IX | X | XI | XII | — | — |
| Fiber Length mm | 30 | 12 | continuous fibers | 30 | — | — |
| Ratio of Bundles Vol % | 85 | 85 | unmeasured | 85 | — | — |
| Average Number of Fibers N | 880 | 420 | unmeasured | 880 | — | — |
| Volume Ratio of Carbon Fibers Vf | 6 | 43 | 28 | 43 | — | — |
| Thermoplastic Resin | nylon 6 | nylon 6 | nylon 6 | nylon 6 | nylon 6 | polycarbonate |
| Content of Carbon Black relative to Thermoplastic Resin | 1.8 wt % | 1.8 wt % | 1.8 wt % | 1.8 wt % | 0 wt % | 0 wt % |
| Production Method for Molded Article | press molding | press molding | press molding needle punch | press molding | press molding | press molding |
| Energy Director | yes | yes | yes | no | — | — |
| Vf | 2 | 43 | 25 | — | — | — |
| Production Method | integrated in molding | integrated in molding | integrated in molding | — | — | — |
| Condition of Application Surface | smooth | convexed | smooth | smooth | — | — |
| tan δ | | | | | | |
| tan δ by Viscoelastic Measurement | 0.110 | 0.045 | 0.105 | 0.058 | 0.151 | 1.590 |
| Ratio of the maximum value of tan δ by viscoelastic measurement of molded article, to the maximum value of tan δ by viscoelastic measurement of thermoplastic resin contained in molded article (%) | 73% | 30% | 70% | 38% | — | — |
| Remarks | | | produced by needle-punching of continuous fibers | no energy director | | |

* PC is an abbreviation of polycarbonate.

TABLE 2

|  | Example 1 | Example 2 | Example 3 | Example 4 | Example 5 | Example 6 | Example 7 |
|---|---|---|---|---|---|---|---|
| Fiber-Reinforced |  |  |  |  |  |  |  |
| Molded Article (X) | I | II | III | IV | V | VI | VII |
| Member (Y) | XII | XII | XII | XII | XII | XII | XII |
| Remarks |  |  |  |  |  |  |  |
| Fiber-Reinforced Plastic Joined Body |  |  |  |  |  |  |  |
| Tensile Shear Strength MPa | 35 | 35 | 35 | 30 | 31 | 30 | 33 |
| Evaluation of Stability of Ultrasonic Welding | excellent | excellent | good | good | good | good | excellent |
| Unmelted Remaining Energy Directors | very few | very few | a few | a few | a few | a few | very few |
| Remarks |  |  |  |  |  |  |  |

|  | Example 8 | Example 9 | Comparative Example 1 | Comparative Example 2 | Comparative Example 3 | Comparative Example 4 |
|---|---|---|---|---|---|---|
| Fiber-Reinforced |  |  |  |  |  |  |
| Molded Article (X) | VIII | XII | IX | X | XI | XII |
| Member (Y) | XII | I | XII | XII | XII | XII |
| Remarks |  |  |  |  |  | spot welding |
| Fiber-Reinforced Plastic Joined Body |  |  |  |  |  |  |
| Tensile Shear Strength MPa | 31 | 35 | 25 | 25 | 25 | 38 |
| Evaluation of Stability of Ultrasonic Welding | good | excellent | bad | bad | bad | — |
| Unmelted Remaining Energy Directors | a few | very few | many | many | many | (no ED) |
| Remarks |  |  |  |  |  | Holes formed in the horn-pressed area |

TABLE 3

|  | Example 10 | Example 11 | Example 12 | Example 13 | Example 14 | Example 15 |
|---|---|---|---|---|---|---|
| Fiber-Reinforced Molded Article (X) | X201 | X202 | X203 | X204 | X205 | X206 |
| Fiber Length mm | 30 | 30 | 30 | 30 | 30 | 30 |
| Ratio of Bundles Vol % | 85 | 85 | 85 | 85 | 85 | 85 |
| Average Number of Fibers N | 420 | 420 | 420 | 420 | 420 | 420 |
| Volume Ratio of Carbon Fibers Vf | 43 | 43 | 43 | 43 | 43 | 43 |
| Carbon Black Relative to Thermoplastic Resin | 1.8 wt % | 1.8 wt% | 1.8 wt% | 1.8 wt % | 1.8 wt % | 1.8 wt % |
| tan δ |  |  |  |  |  |  |
| tan δ by Viscoelastic Measurement | 0.042 | 0.042 | 0.042 | 0.042 | 0.042 | 0.042 |

TABLE 3-continued

|  |  |  |  |  |  |  |
|---|---|---|---|---|---|---|
| Ratio of the maximum value of tan δ by viscoelastic measurement of molded article, to the maximum value of tan δ by viscoelastic measurement of thermoplastic resin contained in molded article (%) | 27.8 | 27.8 | 27.8 | 27.8 | 27.8 | 27.8 |
| Energy Director |  |  |  |  |  |  |
| Shape | FIG. 4 (b) | FIG. 4 (c), FIG. 11 | FIG. 4 (b) | FIG. 4 (b) | FIG. 4 (a) | FIG. 4 (c), FIG. 11 |
| Radius of Curvature mm | 0.57 | — | 1.3 | 0.725 | 0.5 | — |
| Height mm | 0.3 | 0.228 | 0.1 | 0.2 | 0.5 | 0.50 |
| Volume mm³ | 0.132 | 0.132 | 0.040 | 0.083 | 0.262 | 0.225 |
| Cross-Sectional Area Change Amount mm²/mm | 2.62 | 1.72 | 7.85 | 3.93 | 1.57 | 0.39 |
| Production Method | integrated in molding | integrated in molding | integrated in molding | integrated in molding | integrated in molding | integrated in molding |
| Condition of Application Surface | smooth | smooth | smooth | smooth | smooth | smooth |
| Thermoplastic Resin Member (Y) | Y301 | Y301 | Y301 | Y301 | Y301 | Y301 |
| Fiber-Reinforced Plastic Joined Body |  |  |  |  |  |  |
| Tensile Shear Strength MPa | 35 | 35 | 31 | 35 | 35 | 35 |
| Dimensional Stability (projected area of energy director)/ (projected area of welded part) (%) | A (Excellent) 67 | B (Good) 67 | A (Excellent) 67 | A (Excellent) 67 | C (Better) 67 | C (Better) 67 |
| Stability of Ultrasonic Welding | excellent | excellent | excellent | excellent | excellent | excellent |

|  |  | Example 16 | Example 17 | Example 18 | Example 19 | Example 20 |
|---|---|---|---|---|---|---|
|  | Fiber-Reinforced Molded Article (X) | X207 | X208 | X209 | X210 | X211 |
|  | Fiber Length mm | 30 | 30 | 30 | 30 | 30 |
|  | Ratio of Bundles Vol % | 85 | 85 | 85 | 85 | 85 |
|  | Average Number of Fibers N | 420 | 420 | 420 | 420 | 420 |
|  | Volume Ratio of Carbon Fibers Vf | 43 | 43 | 43 | 43 | 43 |
|  | Carbon Black Relative to Thermoplastic Resin | 1.8 wt % | 1.8 wt % | 1.8 wt % | 1.8 wt % | 1.8 wt % |
|  | tan δ |  |  |  |  |  |
|  | tan δ by Viscoelastic Measurement | 0.042 | 0.042 | 0.042 | 0.042 | 0.042 |
|  | Ratio of the maximum value of tan δ by viscoelastic measurement of molded article, to the maximum value of tan δ by viscoelastic measurement of thermoplastic resin contained in molded article (%) | 27.8 | 27.8 | 27.8 | 27.8 | 27.8 |

TABLE 3-continued

| Energy Director | | | | | |
|---|---|---|---|---|---|
| Shape | FIG. 4 (b) | FIG. 4 (b) | FIG. 10 (b) | FIG. 9 (a), FIG. 12 | FIG. 9 (b), FIG. 13 |
| Radius of Curvature mm | 0.57 | 0.57 | — | — | — |
| Height mm | 0.3 | 0.3 | 0.3 | 0.5 | 0.55 |
| Volume mm$^3$ | 0.132 | 0.132 | 0.100 | 0.132 | 0.132 |
| Cross-Sectional Area Change Amount mm$^2$/mm | 2.62 | 2.62 | 2.68 | 1.56 | 1.43 |
| Production Method | integrated in molding | integrated in molding | integrated in molding | integrated in molding | integrated in molding |
| Condition of Application Surface | smooth | smooth | smooth | smooth | smooth |
| Thermoplastic Resin Member (Y) | Y301 | Y301 | Y301 | Y301 | Y301 |
| Fiber-Reinforced Plastic Joined Body | | | | | |
| Tensile Shear Strength MPa | 32 | 30 | 35 | 35 | 35 |
| Dimensional Stability (projected area of energy director)/(projected area of welded part) (%) | A (Excellent) 30 | A (Excellent) 20 | A (Excellent) 67 | D (Bad) 67 | D (Bad) 67 |
| Stability of Ultrasonic Welding | good | bad | excellent | bad | bad |

INDUSTRIAL APPLICABILITY

The fiber-reinforced plastic joined body of the present invention has excellent productivity and joining strength (welding strength) and can be used for a purpose that requires excellent welding strength, for example, for automobile structural parts, etc., and secures weight reduction of car bodies.

REFERENCE SIGNS LIST

1: Fiber-Reinforced Molded Article (X)
2: Thermoplastic Resin Member (Y)
3: Energy Director
4: Welding Horn for Ultrasonic Application
x: Joining Surface (x)
y: Joining Surface (y)
103: Mountain-Shaped Energy Director
105: Base
106: Top
107: Angle to Top
108: Straight Line Drawn from Base toward Top
109: Example of Convex Portion Existing from Base toward Top
110: Transition Interval where the cross-sectional area of the energy director in the joining surface direction increases from the top toward the base
111: Range just below Welding Horn
112: Welding Area

The invention claimed is:

1. A method for producing a fiber-reinforced plastic joined body in which a fiber-reinforced molded article (X) containing carbon fibers and a thermoplastic resin and having a joining surface (x), and a thermoplastic resin member (Y) having a joining surface (y) are welded via the joining surface (x) and the joining surface (y) by applying ultrasonic to the fiber-reinforced molded article (X), wherein:

(1) a maximum value of tan δ by viscoelastic measurement of the fiber-reinforced molded article (X) is less than 70% of a maximum value of tan δ by viscoelastic measurement of the thermoplastic resin contained in the fiber-reinforced molded article (X) within a range of a glass transition temperature ±100° C. of the thermoplastic resin contained in the fiber-reinforced molded article (X), (2) the joining surface (x), the joining surface (y), or both, has an energy director, and (3) an application surface of the fiber-reinforced molded article (X) to which ultrasonic sound is applied is smooth, and the energy director is a mountain-shaped energy director satisfying the following (4) to (6);

(4) the mountain-shaped energy director has a convex part in the area from a base up to a top thereof, (5) the mountain-shaped energy director has a transition interval from the top toward the base thereof where a cross-sectional area of the energy director in a direction of the joining surface increases, and (6) an amount of change in an area of a horizontal section of the energy director in the transition interval is 0.1 mm$^2$ or more per mm in a vertical direction relative to a joining direction.

2. The method for producing a fiber-reinforced plastic joined body according to claim 1, wherein an amount of change in an area of a horizontal section of the energy director in the transition interval is 0.5 mm$^2$ or more per mm in a vertical direction relative to a joining direction.

3. The method for producing a fiber-reinforced plastic joined body according to claim 1, wherein a ridge line of the mountain-shaped energy director is an arc having a radius of curvature of 0.1 to 2 mm.

4. The method for producing a fiber-reinforced plastic joined body according to claim 1, wherein a projected area of the mountain-shaped energy director is 25 to 105% of a projected area of the welded part after joining.

5. The method for producing a fiber-reinforced plastic joined body according to claim 4, wherein a projected area of the mountain-shaped energy director is 35 to 95% of the projected area of the welded part after joining.

6. The method for producing a fiber-reinforced plastic joined body according to claim 1, wherein the fiber-reinforced molded article (X) contains 3 parts by mass to 1000 parts by mass of a thermoplastic resin relative to 100 parts by mass of carbon fibers.

7. The method for producing a fiber-reinforced plastic joined body according to claim 1, wherein the fiber-reinforced molded article (X) contains carbon fiber bundles.

8. The method for producing a fiber-reinforced plastic joined body according to claim 1, wherein the carbon fibers contained in the fiber-reinforced article (X) include, as mixed therein, carbon fiber bundles (A) constituted by a critical number of single fiber of carbon fibers or more and carbon fiber bundles (B1) of less than the critical number of single fiber and/or single carbon fibers (B2), the ratio of the carbon fiber bundles (A) to a total amount of fibers is 20 to 99% by volume, and an average number (N) of fibers in the carbon fiber bundles (A) satisfies the requirement of the following formula:

$$\text{Critical number of single fiber} = 600/D \quad (a)$$

$$0.6 \times 10^4/D^2 < N < 6 \times 10^5/D^2 \quad (b)$$

wherein D is an average fiber diameter (μm) of carbon fibers.

9. The method for producing a fiber-reinforced plastic joined body according to claim 1, wherein an average fiber length of the carbon fibers is 1 to 100 mm.

10. The method for producing a fiber-reinforced plastic joined body according to claim 1, wherein the thermoplastic resin member (Y) contains carbon fibers.

11. The method for producing a fiber-reinforced plastic joined body according to claim 1, wherein the energy director is integrated with at least one of the fiber-reinforced molded article (X) containing two-dimensionally randomly oriented discontinuous carbon fibers, or the thermoplastic resin member (Y) containing two-dimensionally randomly oriented discontinuous carbon fibers, and
a volume ratio of the carbon fibers (Vf) in the energy director is lower than a volume ratio of the carbon fibers (Vf) in the fiber-reinforced molded article (X) or the thermoplastic resin member (Y) integrated with the energy director.

12. The method for producing a fiber-reinforced plastic joined body according to claim 1, wherein the thermoplastic resin contained in the fiber-reinforced molded article (X) is polyamide 6, and the maximum value of tan δ by viscoelastic measurement of the fiber-reinforced molded article (X) is 0.02 to 0.1 within the range of the glass transition temperature ±100° C. of the thermoplastic resin contained in the fiber-reinforced molded article (X).

13. A fiber-reinforced molded article (X) comprising carbon fibers and a thermoplastic resin and having a joining surface (x), the fiber-reinforced molded article (X) being utilized in production of a fiber-reinforced plastic joined body by ultrasonic application thereto, wherein:
(1) a maximum value of tan δ by viscoelastic measurement of the fiber-reinforced molded article (X) is less than 70% of a maximum value of tan δ by viscoelastic measurement of the thermoplastic resin contained in the fiber-reinforced molded article (X) within a range of a glass transition temperature ±100° C. of the thermoplastic resin contained in the fiber-reinforced molded article (X),
(2) the joining surface (x) has an energy director, and
(3) an application surface of the fiber-reinforced molded article (X) to which ultrasonic sound is applied is smooth,
and the energy director is a mountain-shaped energy director satisfying the following (4) to (6);
(4) the mountain-shaped energy director has a convex part in the area from the base up to the top thereof,
(5) the mountain-shaped energy director has a transition interval from the top toward the base thereof where the cross-sectional area of the energy director in the direction of the joining surface increases, and
(6) an amount of change in the area of the horizontal section of the energy director in the transition interval is 0.1 mm or more per mm in the vertical direction relative to the joining direction.

14. A method for producing a fiber-reinforced plastic joined body in which a fiber-reinforced molded article (X) containing carbon fibers and a thermoplastic resin and having a joining surface (x), and a thermoplastic resin member (Y) having a joining surface (y) are welded via the joining surface (x) and the joining surface (y) by applying ultrasonic to the fiber-reinforced molded article (X), wherein:
(2) the joining surface (x), the joining surface (y), or both, has an energy director, and
the energy director is a mountain-shaped energy director satisfying the following (4) to (6);
(4) the mountain-shaped energy director has a convex part in the area from a base up to a top thereof,
(5) the mountain-shaped energy director has a transition interval from the top toward the base thereof where the cross-sectional area of the energy director in the direction of the joining surface increases, and
(6) an amount of change in the area of the horizontal section of the energy director in the transition interval is 0.1 mm$^2$ or more per mm in the vertical direction relative to the joining direction.

* * * * *